United States Patent

Rudick et al.

[11] Patent Number: 5,947,334
[45] Date of Patent: Sep. 7, 1999

[54] POST-MIX BEVERAGE SYSTEM FOR USE IN EXTRA-TERRESTRIAL SPACE

[75] Inventors: Arthur G. Rudick, Atlanta; Ashis Gupta, Marietta; Michael J. Myers, Lawrenceville; Christopher C. Kjorlaug, Alpharetta, all of Ga.; Alexander Hoehn, Boulder, Colo.; Louis S. Stodieck, Boulder, Colo.; Michael B. Horner, Boulder, Colo.; Mark T. Edwards, Boulder, Colo.; Kirsten S. Sterrett, Westminster, Colo.; Jon A. Genova; Mark A. Rupert, both of Boulder, Colo.

[73] Assignee: The Coca-Cola Company, Atlanta, Ga.

[21] Appl. No.: 08/858,094

[22] Filed: May 17, 1997

Related U.S. Application Data

[60] Provisional application No. 60/017,821, May 17, 1996.

[51] Int. Cl.$^6$ .............................. B67D 5/56; G01F 11/04
[52] U.S. Cl. .................................... 222/129.2; 222/129.3; 222/129.4; 222/145.5; 222/253
[58] Field of Search ............................. 222/129.1, 129.3, 222/129.4, 145.5, 333, 253

[56] References Cited

U.S. PATENT DOCUMENTS

| | | |
|---|---|---|
| 4,596,341 | 6/1986 | Bruffey . |
| 4,629,589 | 12/1986 | Gupta et al. . |
| 4,709,734 | 12/1987 | Rudick et al. . |
| 4,752,018 | 6/1988 | Rudick et al. . |
| 4,785,974 | 11/1988 | Rudick et al. . |
| 4,808,348 | 2/1989 | Rudick et al. . |
| 4,808,349 | 2/1989 | Rudick . |
| 4,822,531 | 4/1989 | Rudick et al. ............................. 261/25 |
| 4,839,107 | 6/1989 | Rudick et al. . |
| 4,846,234 | 7/1989 | Rudick . |
| 4,848,418 | 7/1989 | Rudick et al. . |
| 4,875,508 | 10/1989 | Burke, II et al. . |
| 4,892,125 | 1/1990 | Rudick et al. . |
| 4,907,724 | 3/1990 | Wing, Jr. et al. . |
| 4,930,555 | 6/1990 | Rudick ...................................... 141/98 |
| 5,135,137 | 8/1992 | Rudick . |
| 5,190,083 | 3/1993 | Gupta et al. . |

*Primary Examiner*—Joseph A. Kaufman
*Assistant Examiner*—Keats Quinalty

[57] ABSTRACT

A system to mix, carbonate, if desired, and dispense beverages in the micro-gravity environment of extra-terrestrial space incorporates chilled sources of beverage syrup, water and $CO_2$, mixing chambers for receiving the fluid components of the beverages and receptacle interfaces which selectively communicate with the mixing chambers and which couple with drinking receptacles formed by a pressure-resistant outer shell and a flexible internal liner. Within the mixing chambers, a reciprocable piston is driven by an entering pressurized beverage component to a retracted position and is subsequently driven by compressed air to an extended position with a concurrent expulsion of the mixed beverage from the mixing chamber and into the liner of a drinking receptacle coupled to one of the receptacle interfaces. A formation on the piston reacts with an agitator to enhance mixing of the beverage components. The transfer of the beverage to the drinking receptacle occurs against a compressed air counter-pressure established within the drinking receptacle between the shell and the liner. When the beverage transfer is complete, the counter-pressure is relieved, whereupon the drinking receptacle can be uncoupled from the receptacle interface for consumption of the beverage. The flows of beverage components and mixtures and the establishment and relief of fluid pressures are controlled by a micro-processor which responds to inputs from a crew member entered through a touch screen display panel. The microcomputer also collects data relating to taste perceptions and physiological responses of the crew.

12 Claims, 15 Drawing Sheets

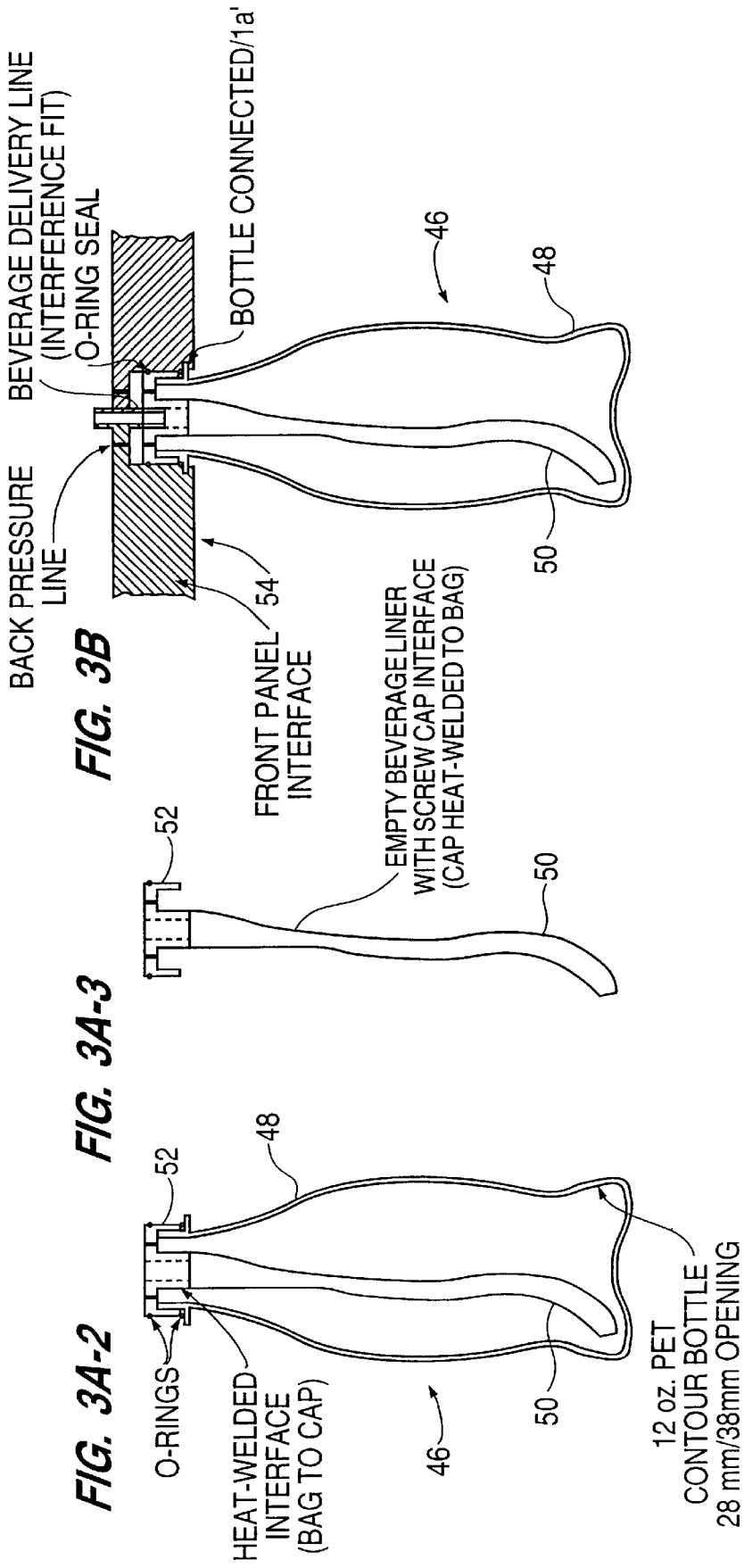

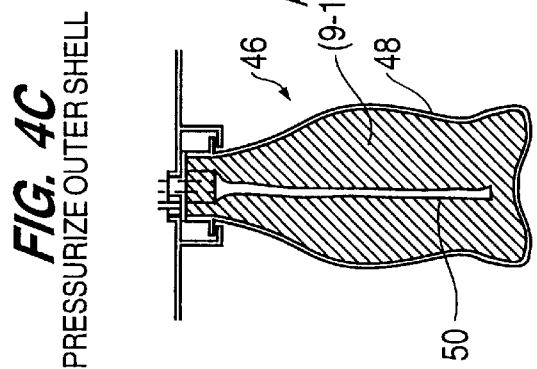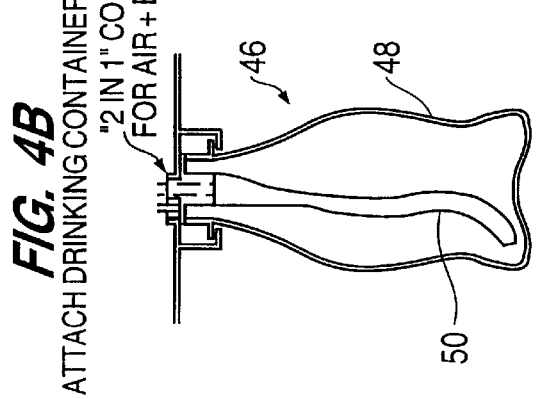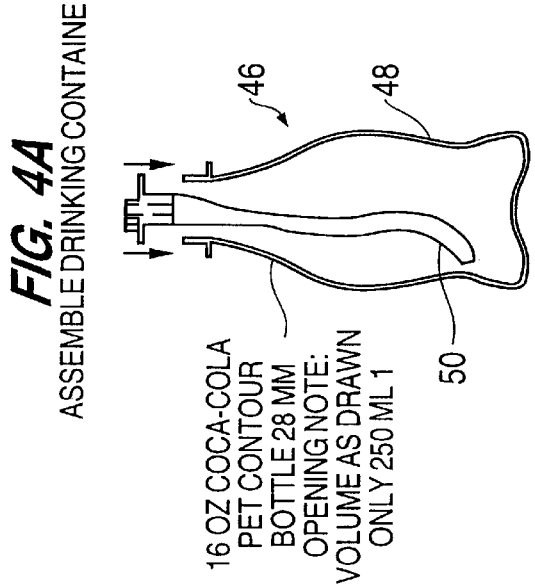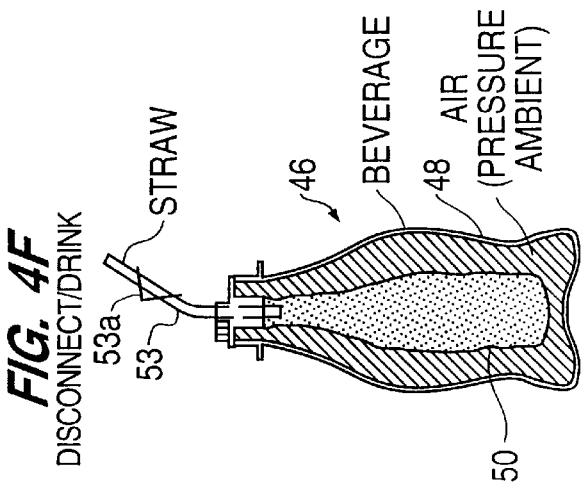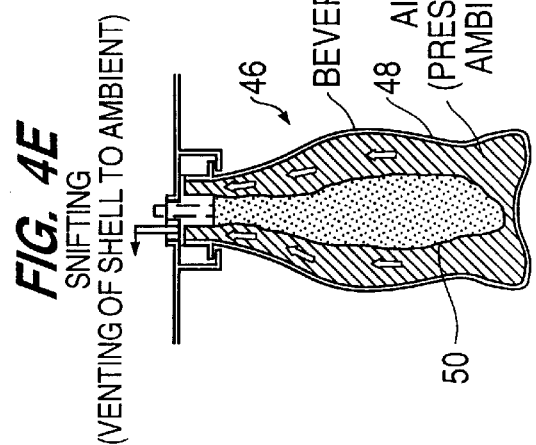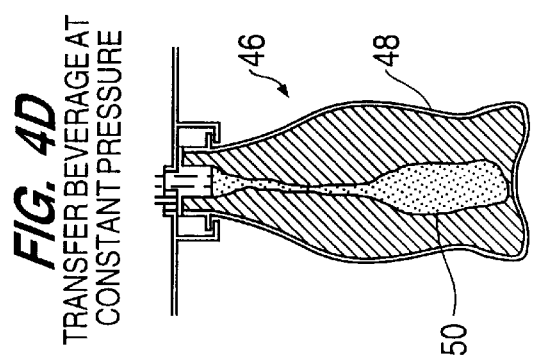

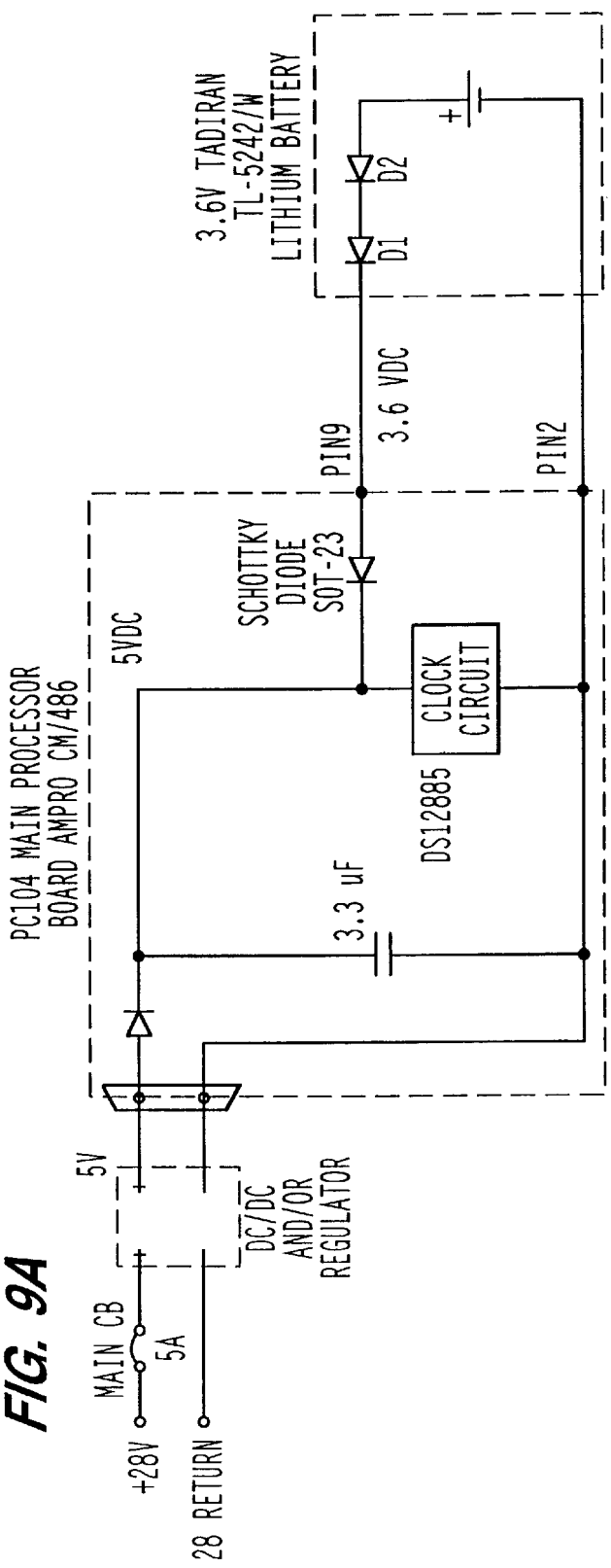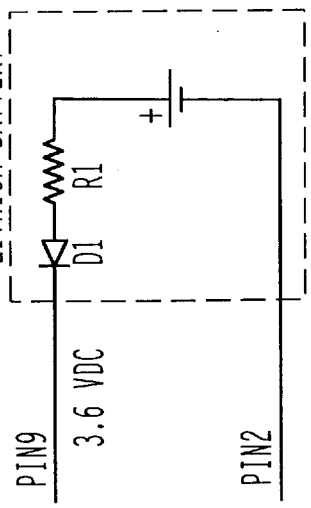
FIG. 9A
FIG. 9B
ALTERNATE BATTERY PROTECTION

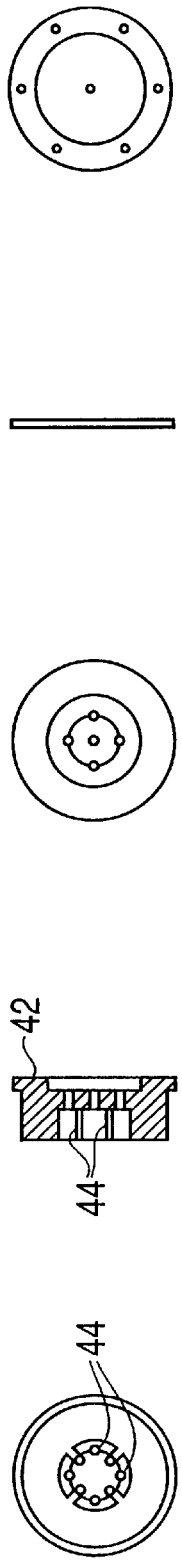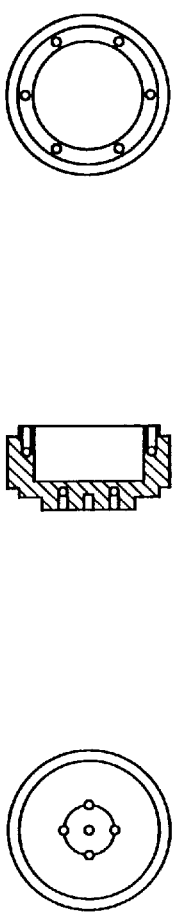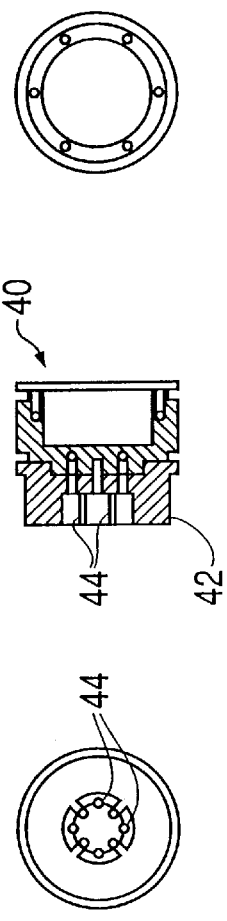

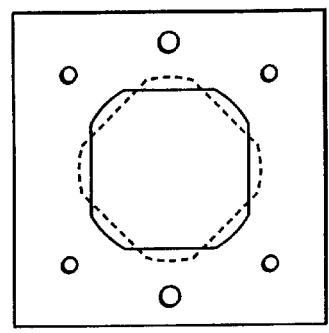
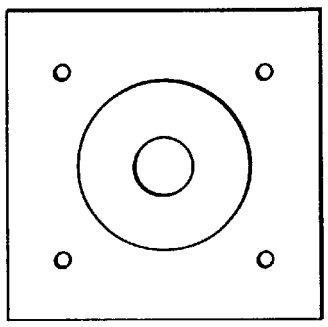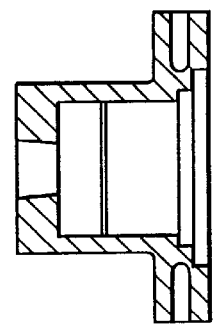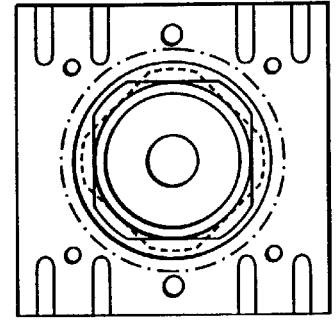
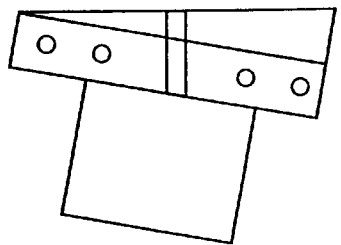

POST-MIX BEVERAGE SYSTEM FOR USE IN EXTRA-TERRESTRIAL SPACE

This application claims priority on provisional application Ser. No. 60/017,821 filed on May 17, 1996, the entire contents of which are hereby incorporated by reference.

BACKGROUND OF THE INVENTION

The present invention is directed to a post-mix beverage preparation and dispensing system which is adapted for use in micro-gravity environments which are encountered in extra-terrestrial space. More particularly, the beverage system provides for the preparation and dispensing of carbonated and non-carbonated beverages aboard space vehicles such as the NASA space shuttle and the planned International Space Station. The beverage system also incorporates a data acquisition system through which taste perceptions and physiological responses of the space vehicle crew members may be assessed.

OBJECTS OF THE INVENTION

The beverage system will support three primary commercial/scientific objectives. First, it will provide information relating to taste perception changes that may occur as a consequence of exposure to microgravity. During space flight, astronauts undergo a number of physiological changes including bulk fluid shift from the lower extremities to the head region and subsequent dieresis. Nervous system and blood chemistry changes also occur. All of these microgravity effects have been reported to change taste perception.

Taste perception is of particular interest. Taste alterations noted in microgravity are similar to changes noted by segments of the population on earth. These taste changes are derived from physiological changes associated with aging, extended bed rest, disease, etc. Space flight may well serve as a natural, accelerated model for the study of such changes in the absence of medical dysfunctions.

The beverage system will provide data from astronauts on the taste perception of carbonated as well as non-carbonated beverages consumed on orbit. An additional benefit of the beverage system payload will be the provision to astronauts of good tasting products that can be used for increasing hydration levels. This is especially important prior to return to Earth to prevent some of the debilitating effects of fluid shifts associated with reentry.

The second objective addresses heart rate variability and heart rate changes of astronauts before, during, and after beverage consumption in flight. Information from this research will help future product development.

The third commercial objective of the beverage system relates to the storage and transfer of two-phase, carbonated fluids. There is particular interest in advancing fluid management technology in microgravity. The beverage system represents a significant opportunity to obtain fundamental data on containment and transfer of pressurized, supersaturated two-phase fluids. The results derived from this effort will assist in developing new hardware for use in microgravity environments such as on the Space Station.

Commercial research interests that will be supported include: propellant and fuel cell flow management, environmental fluid loop control, plant nutrient delivery system development, atmosphere management of aquatic habitats, beverage technologies for Space Station applications, etc. The beverage system is being developed to address a number of technical concerns. Virtually all commercial life sciences investigations involve fluids, gases and liquids or some combination thereof. Data obtained from the beverage system should help in the development of advanced space-qualified animal and plant holding facilities, cell and tissue culture hardware, and biomaterials processing systems.

The foregoing objects of the invention, and others, are attained by providing an apparatus for preparing and dispensing a beverage comprising: sources of fluid beverage components; a mixing chamber provided with inlet and discharge ports; a piston disposed within the mixing chamber for reciprocal movement between extended and retracted positions; first means for (1) introducing the beverage components in a predetermined sequence under pressure into the mixing chamber and (2) shifting the piston from the extended position to the retracted position in response to the introduction into the mixing chamber of a first one of the beverage components; and second means for urging the piston to the extended position to thereby dispense a mixture of the beverage components through the discharge port.

The detailed description which follows, to be read in conjunction with the accompanying drawings, will afford a comprehensive understanding of the present invention. However, it should be understood that the disclosed preferred embodiments of the invention are illustrative only, since various modifications within the spirit and scope of the invention may become apparent to persons of ordinary skill in the art who have had the benefit of this disclosure.

BRIEF DESCRIPTION OF THE DRAWINGS

FIGS. 3A-1, 3A-2 and 3A-3 illustrate components of the drinking receptacle;

FIG. 3B illustrates the drinking receptacle coupled to the receptacle interface;

FIGS. 4A–4F illustrate a sequence of steps for use of the drinking receptacle;

FIGS. 9A illustrates a battery protection circuit employed in the control computer for the beverage system;

FIG. 9B illustrates a modification of the circuit illustrated in FIG. 9A;

FIG. 10B-1 is an enlarged cross-sectional view taken on section line 10B-1 in FIG. 10B.

FIGS. 12A-1, 12A-2 and 12A-3 illustrate front, cross-sectional and front views, respectively, of the annular formation of the piston;

FIGS. 12B-1, 12B-2 and 12B-3 illustrate front, cross-sectional and front views, respectively, of the rear component of the piston;

FIGS. 12C-1, 12C-2 and 12C-3 illustrate front, corss-sectional and front views, respectively, of the assembled piston;

FIGS. 12D-1 and 12D-2 illustrate side and rear views of the retaining ring for the piston seal;

FIGS. 14A–14C illustrate front, cross-sectional and rear views, respectively, of the drinking receptacle interface socket disposed on the front panel of the enclosure module;

FIG. 14D illustrates a side view of the assembled socket and plate of the drinking receptacle interface disposed on the front panel of the enclosure module;

FIGS. 14E–14F illustrate front and cross-sectional views, respectively, of the drinking receptacle interface plate disposed on the front panel of the enclosure module.

DETAILED DESCRIPTION OF PREFERRED EMBODIMENTS

Figure 1:
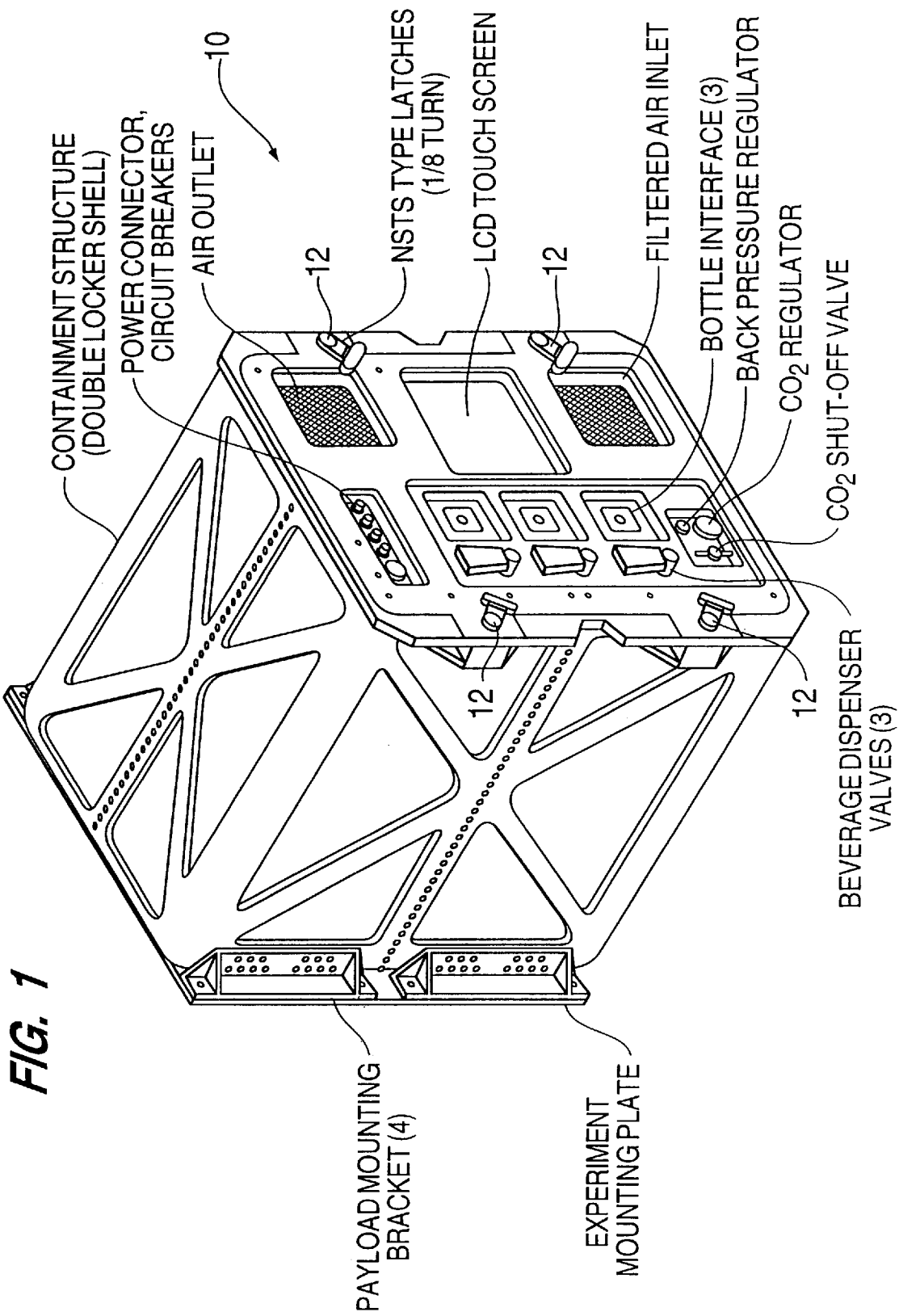
FIG. 1 is a perspective illustration of the beverage system enclosure module.

To the extent necessary, the entirety of the disclosures of the following U.S. patents are incorporated by reference:

Gupta et al., No. 4,629,589: BEVERAGE DISPENSER SYSTEM SUITABLE FOR USE IN OUTER SPACE Rudick et al., No. 4,785,974: A SYSTEM FOR SERVING A PRE-MIX BEVERAGE OR MAKING AND SERVING A POST-MIX BEVERAGE IN THE ZERO GRAVITY CONDITIONS OF OUTER SPACE Bruffey, No. 4,596,341: SPACE CUP Wing, Jr. et al., No. 4,907,724: DISPOSABLE PRE-MIX BEVERAGE PACKAGE FOR USE IN OUTER SPACE Burke, II et al., No. 4,875,508: BEVERAGE CONTAINER SUITABLE FOR USE IN OUTER SPACE Rudick et al., No. 4,892,125: A SYSTEM FOR SERVING A PRE-MIX BEVERAGE OR MAKING AND SERVING A POST-MIX BEVERAGE IN THE ZERO GRAVITY CONDITIONS OF OUTER SPACE Gupta et al., No. 5,190,083: MULTIPLE FLUID SPACE DISPENSER AND MONITOR Rudick et al., No. 4,752,018: MICROGRAVITY PRE-MIX PACKAGE Rudick et al., No. 4,708,734: HIGH PRESSURE SYSTEM FOR FILLING PRE-MIX MICROGRAVITY PACKAGE Rudick et al., No. 4,839,107: MICROGRAVITY CARBONATOR Rudick, No. 4,848,418: MICROGRAVITY DISPENSER Smazih et al., No. 4,808,348: MICROGRAVITY CARBONATOR Rudick, No. 4,846,234: MICROGRAVITY DISPENSER WITH AGITATOR, METERING DEVICE AND CUP FILLER Rudick et al., No. 4,822,531: NON-VENDING MICROGRAVITY CARBONATOR Rudick et al., No. 4,808,349: NON-VENTING SPRING CONSISTED MICROGRAVITY CARBONATOR Rudick, No. 5,135,137: SIMPLIFIED MICROGRAVITY PRE-MIX PACKAGE Rudick, No. 4,930,555: MICROGRAVITY DISPENSER WITH AGITATOR, METERING DEVICE AND CUP FILLER An embodiment of a beverage system according to the present invention, designed for use aboard the Space Shuttle, dispenses three types of beverages, two carbonated and one non-carbonated in drinks of four ounces each. The beverage system provides for replaceable storage of water, pressurized $CO_2$, and beverage syrups. Drinking containers comprise a reusable consumption, or pressure, vessel with disposable inserts. The beverage system also includes means for recording payload-specific operational parameters (temperature, pressure, dispensed fluid) as well as heart rate responses of the crew members before, during and after beverage consumption. The data is recorded by a PC-104-type data acquisition and control computer. The crew interfaces with the computer through a touch screen which provides for information display, screen selection and data entry. A commercially available heart rate monitor, which performs non-intrusive measurements using LEDs, is used to measure the physiological responses to beverage consumption (heart rate, oxygen saturation levels).

The beverage system consists of three major subsystems which are:

Mechanical, including:
1) the enclosure module,
2) the fluid Management and distribution system, and
3) the drinking containers.

Thermal, consisting of:
1) solid state thermoelectric coolers,
2) insulation,
3) water/beverage heat exchangers, and
4) a forced air convective cooling system (multiple fans, finned heat exchangers) for heat rejection to the cabin atmosphere.

Electrical, Data Collection and Control, consisting of:
1) the data acquisition and control computer for data collection (engineering and science data) and payload control,
2) the heart rate monitor with disposable sensors for non-intrusive heart rate monitoring, and
3) the control electronics for power distribution to the thermal, data collection, and fluid management systems.

The enclosure module houses other components of the beverage system (fluid management and distribution system, thermal and electrical subsystem). As illustrated in FIG. 1, the enclosure module 10 occupies a space equivalent to that of two single lockers in the Space Shuttle. An additional locker is required for stowage of the drinking containers (reusable pressure container and disposable drinking bladders), straws, heart rate monitoring sensors, heart rate sensor cable, plastic film bags (for wet stowage of used, disposable drinking bladders).

The beverage system is designed for installation in the Space Shuttle mid-deck. The enclosure module features four standard mid-deck latches 12 with modified latch handles. The contents of the enclosure module can slide in and out of the double-locker sized module as one assembly in a drawer-type insert for late loading and to access the payload components for servicing on ground. Opening and removing the drawer insert in orbit is not planned. The drawer-type insert is held inside the enclosure module by the four latches. In addition, the drawer is tethered (two tethers) to prevent complete removal of the drawer from the enclosure module.

Figure 2A:
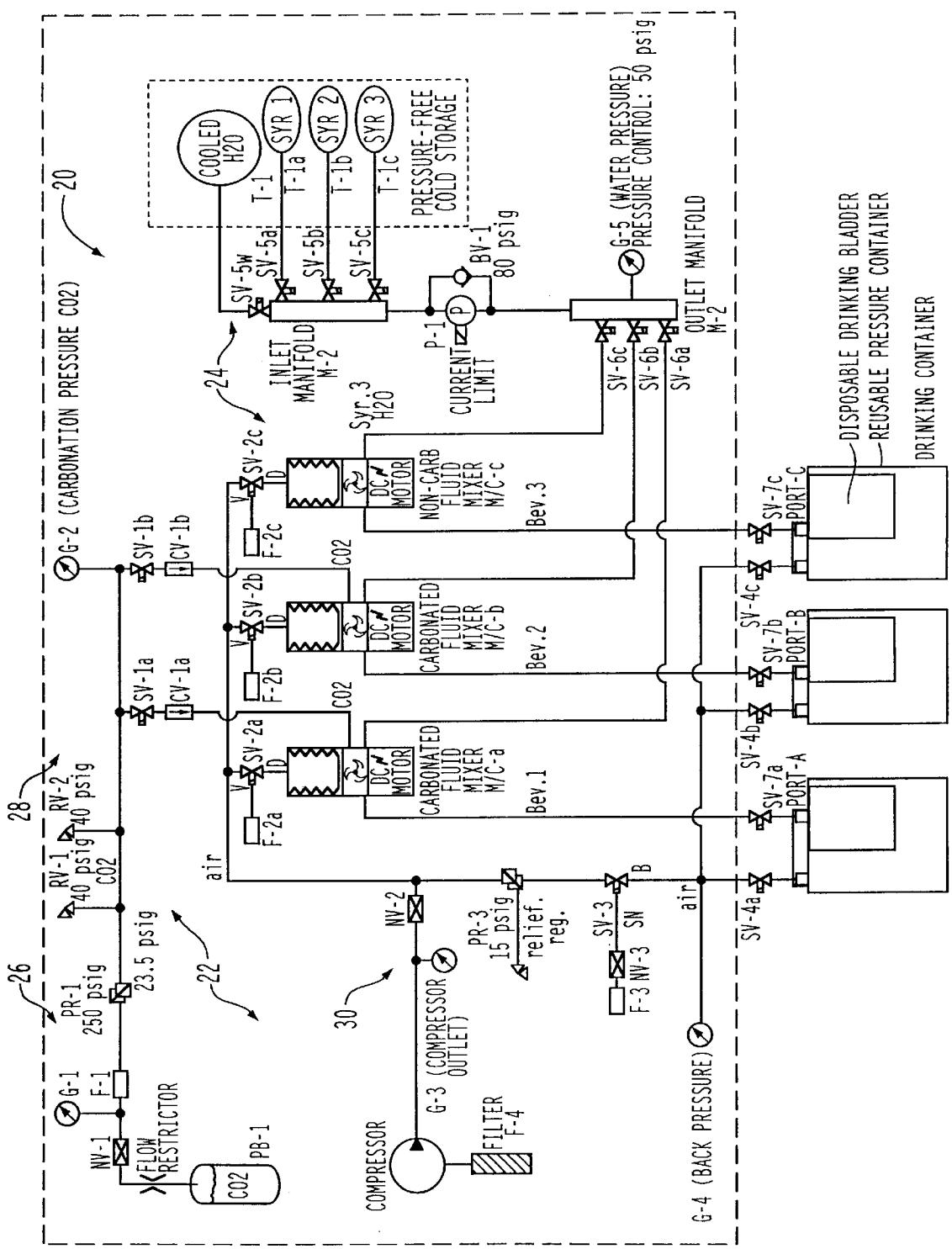
FIG. 2A is a schematic representation of the fluid management and distribution system.
Figure 2B:
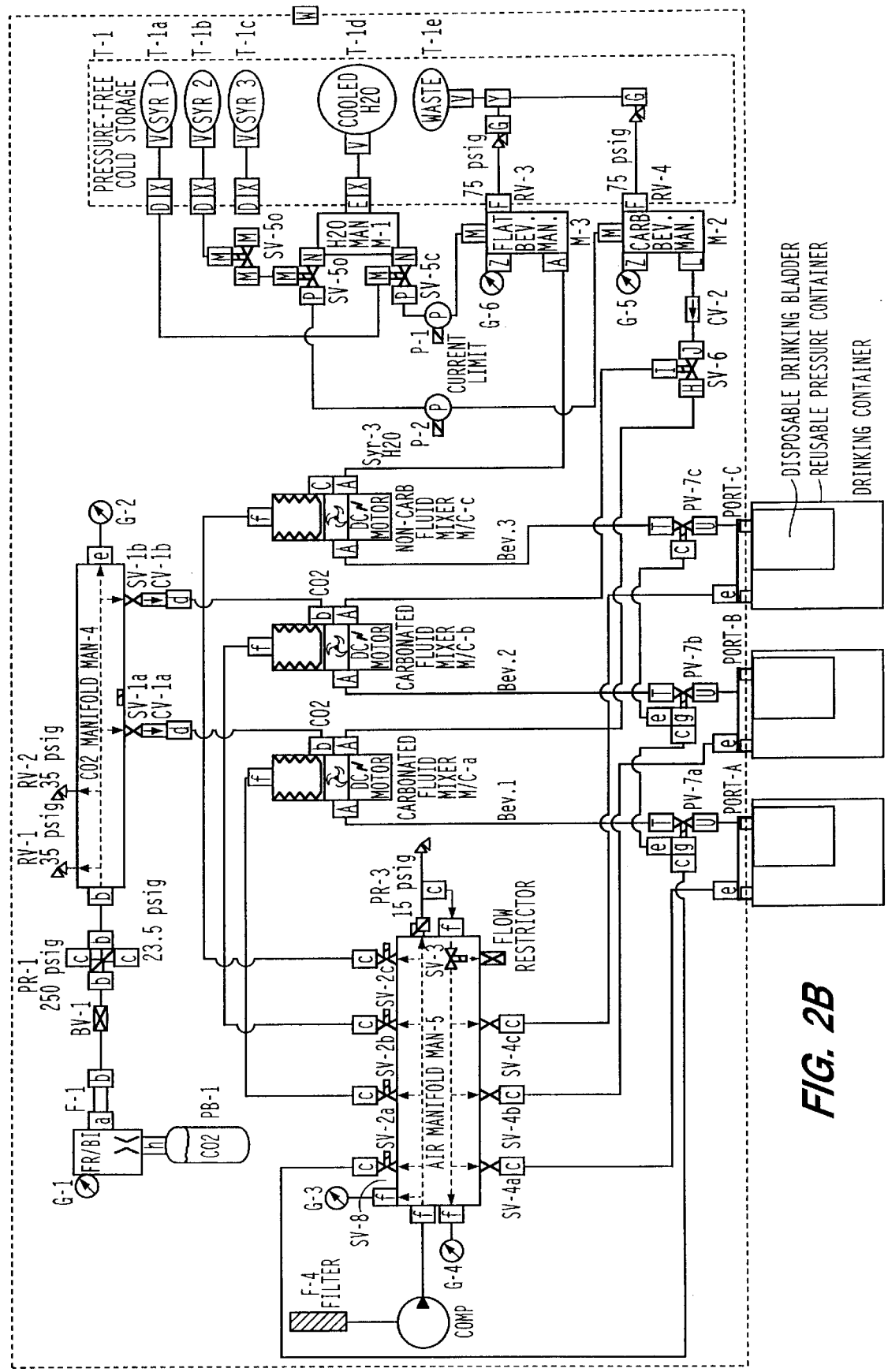
FIG. 2B is a schematic representation of a modified fluid management and distribution system.

The fluid Management and distribution system 20, illustrated schematically in FIG. 2A, includes (a) the pressurization (gaseous) system 22 (high and low pressure $CO_2$, low pressure compressed cabin air), and (b) the beverage (liquid) system 24 (pressure-free storage tanks, pump, liquid heat exchanger, carbonator, distribution valves).

The pressurization system 22 includes (1) the high pressure $CO_2$ subsystem 26 ($CO_2$ storage, approximately 850 psig), (2) the low pressure $CO_2$ subsystem 28 (for carbonation; approximately 23.5 psig), and (3) the low pressure compressed air subsystem 30 (back-pressurization of carbonator and drinking container during beverage transfer, approximately 11–13 psig).

Carbon dioxide is used for beverage carbonation only, while a compressor is used to pressurize the drinking container during beverage transfer from the carbonator into the drinking container (to avoid foaming), as will be described. The use of compressed air (not in contact with beverage) reduces the amount of required $CO_2$ stores. After complete beverage transfer, the compressed air in the drinking container will be slowly depressurized (vented) to the cabin air.

The high pressure $CO_2$ subsystem 26 (maximum design pressure, MDP, 1,600 psig/maximum operating pressure, MOP, 1,066 psig) utilizes a disposable (ground service only) 90 ccm steel pressurant bottle PB-1. The bottle is filled to DOT specifications (max. mass) with food-grade, two-phase $CO_2$. The high pressure two-phase $CO_2$ is down-regulated (two-stage regulator) to a carbonation pressure of 23.5 psig MOP through a two-fault tolerant system, employing a dual-stage regulator PR-1 (max. outlet 30 psig, astronaut adjusted to 23.5 psig) and two pressure relief valves RV-1, RV-2 (factory set and calibrated to 40 psig) in parallel. An in-line filter F-1 (0.5 micron) protects the regulator from possible contamination. A flow restriction upstream of the regulator limits the flow rate from the high pressure system. The two-stage regulator PR-1 and the two relief valves RV-1, RV-2 ensure an MDP of 50 psig for the low pressure system under two combined failures. All systems upstream of the second relief valve are considered the high pressure $CO_2$ subsystem 26, while everything downstream of the 2nd relief valve is considered the low pressure $CO_2$ subsystem 28.

The pressurant bottle PB-1 is factory-filled with $CO_2$ (>99.9% pure $CO_2$) to less than the max. allowable DOT specification (68% mass of water volume of tank). For the 90 ccm tank (disposable bottle), this would result in a fill of less than or equal to 62 grams Of $CO_2$. Since the pressure of the two-phase $CO_2$ is a function of temperature, the mass of the transferred $CO_2$ will be verified rather than the pressure (DOT specification). The mass of the bottle per manufacturer's specifications will be verified prior to installation to guarantee that the bottle is not over-filled.

Regulator PR-1, which regulates the low pressure system 28, is a dual stage, single body regulator (max. operating inlet pressure: 3,500 psig), with a maximum outlet pressure of 30 psig (hardware limited by spring, verified by test). The first stage regulates to 250 psig (factory-set). Both stages of the regulator are identical with respect to pressure rating and can withstand 3,500 psig working pressure. Should both regulator membranes fail open, any one of the two parallel relief valves will limit the low pressure system to 40 psig (nominal). To account for variability of relief pressure and for pressure spikes during discharge, an MDP of 50 psig has been determined (verified by test with regulator removed from system). The relief valves RV-1, RV-2 are designed to provide adequate vent rates without dry ice formation and/or impingement of cold $CO_2$ on astronauts (verified by test). The release of all $CO_2$ into the cabin air would not result in dangerous carbon dioxide concentration (verified by calculation).

The MDP of the high pressure system 26 is a function of the temperature and fill volume (mass); see Table 1. At 30.8° C., the pressure will be approximately 1,066 psia (critical pressure Of $CO_2$). The disposable bottle has a burst pressure rating of more than 6,400 psig (lot tests). All valves and fittings have working pressure ratings of 3,000 to 6,000 psig, with ultimate pressure ratings of four times the working pressure (industry standard).

The low pressure $CO_2$ system 28 is used to carbonate two of the three available beverages. The nominal carbonation pressure is 23.5 psig at 4° C. beverage temperature. The non-carbonated beverage system (for the third beverage) is not connected to the $CO_2$ system. The carbonation pressure is manually adjusted by the astronauts to 23.5 psig (solid state pressure gauge with front panel LCD). Solenoid valves SV-1a, SV-1b control the pressurization of the mixer/carbonators M/C-a, M/V-b with a known amount of $CO_2$ (fixed volume carbonator, known $CO_2$ pressure).

The volume and pressure of $CO_2$ is chosen such that all $CO_2$ can be dissolved (saturation) into the liquid mixture (water and beverage syrup) at the nominal temperature. The MOP of the low pressure $CO_2$ subsystem 28 depends on the desired carbonation level. Nominally, a pressure of 23.5 psig is required for 4° C. cold water at a carbonation level of 2.5 volume $CO_2$ per volume of liquid. The MDP is defined by the regulator and the two relief valves (50 psig, see above). After complete carbonation (saturation has been achieved (approximately 60–120 seconds with agitation in the carbonator), the saturation pressure of the resulting beverage will be 9 psig at 4° C. The saturation pressure depends on the temperature of the beverage (Table 2). The saturation pressures for the chosen carbonation levels as a function of temperature (<35° C. beverage temperature) are lower than the chosen MDP (50 psig) of the pressurization system (50 psig):

The low pressure compressed air subsystem 30 is used to (1) counter-pressure the final carbonated beverage during beverage transfer to prevent foaming, and (2) to expel the beverage from the carbonator. The counter pressure is set to 11–13 psig to remain above carbon dioxide saturation pressures (9 psig at 4° C.). This prevents foaming and bubble development during beverage transfer. The relieving regulator PR-3 guarantees that the pressure in the drinking container remains at <15 psig during beverage transfer. The beverages are expelled by counter-pressurizing the piston inside the carbonator. The compressor has a dead-head pressure of nominal 28 psig. The compressor flow rate determines the rate of liquid flow rate into the drinking container. The dead head pressure of the pump is less than the MDP of the low pressure $CO_2$ system 28 or the MDP of the beverage system 24 (50 psig for final beverage in drinking container). For simplicity reasons, an MDP of 50 psig has also been adopted for the low pressure air system.

The beverage (liquid) system 24 consists of up to 2.5 gallons (9.5 liters) of water in the primary bladder tank T-1, three different bladder syrup tanks T-1a, T-1b, T-1c (1.0 liters each, beverage concentrate/syrup), pump P-1, valves, fittings and beverage distribution/mixing components, the mixer/carbonators and interfaces (see FIGS. 1, 3B, 4 and 14) to the drinking receptacles. Both the water and the syrup tanks are pressure-free (equalized to ambient pressure), collapsible bladder tanks. The bladder tanks are separated from the downstream, pressurized system (after the pump), through the inlet manifold valves SV-5w, SV-5a, SV-5b, SV-5c (normally closed). The bladder tanks are contained inside a second level of containment (water-tight aluminum tank), capable of containing the fluids. All fluid-containing hardware is enclosed inside an insulated, cooled containment to maintain a temperature of approximately 1020° C. This cooler volume serves as an additional, third, level of containment in case of leakage. The enclosure module itself (double-locker) with the front panel serves as an additional (non-sealed) containment.

Figure 13C:
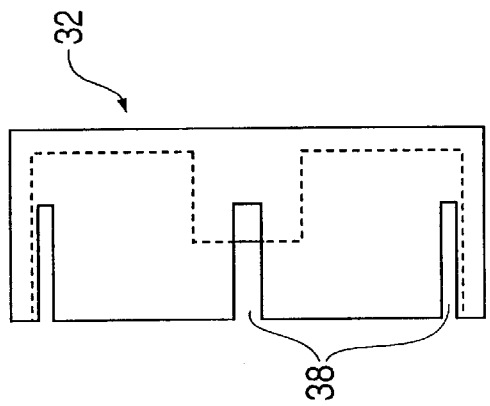
FIGS. 13A, 13B and 13C, illustrate rear, cross-sectional and side views, respectively, of the agitator employed in the mixer/carbonator chambers.
Figure 13B:
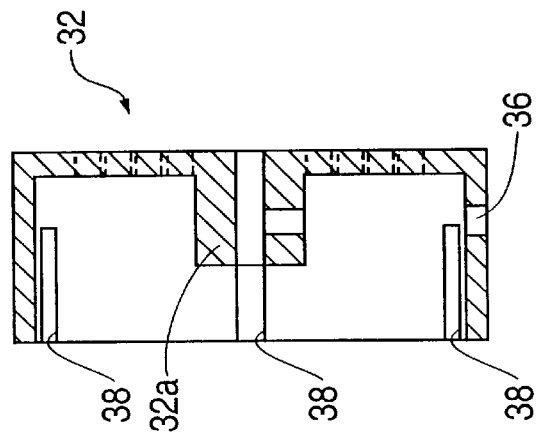
Figure 13A:
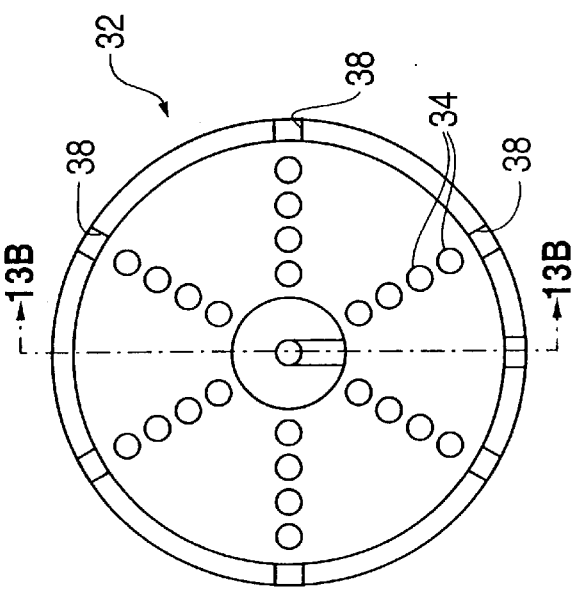

The syrup and water are pumped sequentially from the pressure-free storage bladder tanks through the distribution system (inlet/outlet manifold M-2, pump P-1) into the mixer/carbonator against a counter pressure inside the mixer/carbonator established by the low pressure $CO_2$ subsystem 28 (23.5 psig initially with no $CO_2$ absorbed yet). Water, syrup and $CO_2$ are mixed in the mixer/carbonator through an agitator 32 (rotating cup agitator, see FIGS. 13A, 13B, 13C) to enhance $CO_2$ uptake. Under nominal condition (pump flow rate, pressure and temperature), the absorption of $CO_2$ prevents pressure increases during liquid transfer into the carbonator (pressure actually decreases as $CO_2$ is absorbed). Pump transfer is only enabled while the pressure at pressure sensor/gauge G-5 is below 50 psig. A pressure relief (bleed) valve BV-1 across the pump outlet (adjusted to 80 psig) prevents over pressurization of the liquid system. The dead-head pressure of the pump is 100 psig per manufacturer's specifications. The maximum outlet pressure is additionally controlled through the pump current (stall-protection, three-fault tolerant). An MDP of 100 psig was selected based on the dead-head pressure of the pump, even if the pressure sensor/gauge G-5 (50 psig computer control) and the bleed valve (80 psig) limit the liquid pressure to less than 80 psig. Since each mixer/carbonator is separated from the dispensing system by a valve (SV-7a, SV-7b, SV-7c, electronic position-controlled), the MDP of 100 psig only applies to components between the pump and the carbonator up to the liquid dispensing system. All other beverage systems (drinking container) are designed for an MDP of 50 psig, based on the two-fault tolerant $CO_2$ carbonation system.

The carbonators/mixing chambers incorporate a cup-shaped agitator 32 (illustrated in FIGS. 13A, 13B, 13C) mounted for rotation on a drive shaft extending through an end wall of the chamber. To promote turbulence and thorough mixing, openings 34, 36 extend through the peripheral and base walls of the agitator cup. As illustrated, there are slots 38 through the peripheral wall.

Referring to FIG. 12, the piston 40 for expelling the fluid carries an annular formation 42 with longitudinal scallops or flutes 44 on its inner surface. The scallops, forming a cavity with a peripheral shape somewhat like that of a four-leaf clover, for example, present reaction surfaces for the fluid which prevent the fluid from turning as a plug with the rotating agitator.

The control valves SV-7a, SV-7b, SV-7c are designed to prevent accidental beverage dispensing without a drinking vessel connected to the beverage port. Beverages can only be delivered if a drinking container is connected and if the drinking container can be counter pressured with compressed air (pressure tight). Without the counter pressure inside the drinking container, beverage transfer cannot occur (computer will initiate beverage transfer only if bottles are pressurized). The system is automated (sequential solenoid operation). The beverage volume transferred into the drinking container is controlled by the limited travel of the piston inside the carbonator (4 oz. max.) to avoid over-filling of the drinking container. The liquid volume transferred into the carbonator is controlled by the metering pump P-1 as well as the pressure sensor G-5 to prevent over-pressurization of the carbonator. The bleed valve BV-1 across the pump inlet/outlet further limits the pressure and does not allow liquid transfer into the carbonator should both the pressure sensor G-5 and the metering pump sensor fail.

Beverages are transferred from the mixer/carbonator to the drinking receptacle by compressed cabin air. The piston 40 piston (with two O-ring seals against the mixer/carbonator walls) separates the compressed air at one side of the mixer/carbonator from the beverage at the other side. Compressed air moves the piston to an extended position and thereby expels the beverage into the drinking receptacle. The travel of the piston is limited to four ounces by the end walls of the carbonator. When a carbonated beverage is being prepared, $CO_2$ at 23.5 psig is used to move the piston to a retracted position in the mixer/carbonator. This also determines the exact amount of $CO_2$. When a non-carbonated beverage is being prepared, the pressure of the incoming liquid beverage component moves the piston to the retracted position.

During expulsion of the fluid from the chamber the piston 40 moves toward the agitator 32. The annular formation 42 extension on the piston fits closely within the peripheral wall of the agitator, and the cavity within the annular extension accommodates the end of the agitator drive shaft which protrudes into hub 32a in the agitator cup. At the end of the expulsion stroke, the annular extension and the agitator are closely nested so that only a minuscule volume of liquid remains within the chamber.

The MDPs of all sub-systems are summarized in Table 4. The MDP of the high pressure system is defined by the worst case thermal environment for the $CO_2$ cartridge PB-1 (1,600 psig @ 49° C.). The MDP of the low pressure $CO_2$ system 28 is two-fault tolerant by means of regulator PR-1 and two independent relief valves RV-1, RV-2 (50 psig including dynamic pressure spikes, valve setpoint tolerance). The MDP of the low pressure compressed air system is defined by the dead-head pressure of the compressor (nominal 28 psig). The MDP of the beverage system is defined by the dead-head pressure of the positive displacement pump P-1 (100 psig). For simplicity, the MDP of 50 psig will be applied to all pressurized components downstream of the second $CO_2$ relief valve RV-2 with the exception of the pump system (pump, outlet manifold, carbonators/mixer, dispensing valves), where an MDP of 100 psig has been selected based on the dead-head pressure of the pump.

Referring to FIGS. 3A, 3B and 4, the drinking receptacle 46 (double-layer, bladder-type, new design) consists of two components, (1) an outer, re-usable, personalized 12 oz. pressure-resistant shell 48, which may be of polyethylene terephthalate (PET), designed for 15 psig MOP/50 psig MDP, and (2) an inner, disposable, non-pressurized flexible liner 50 (13 oz.) holding the beverage (4 oz. nominal). The drinking receptacle is assembled by the astronaut, using one of the personalized shells (one per astronaut, one for carbonated, one for non-carbonated beverages) and one of the disposable liners (identical for all drinks). The liner 50 includes a threaded cap 52, which connects the liner bag to the shell. The screw cap has 2 O-rings and couples with an interference fit to the receptacle interface of the beverage system, providing three independent levels of containment during beverage transfer.

Beverage from any of the three mixers/carbonators M/C-a, M/C-b, M/C-c flowing through an individual dispensing valve SV-7a, SV-7b, SV-7c is dispensed into the liner of the assembled and attached drinking container for consumption by the participating crew member. Referring to FIG. 4c, the space between the liner 50 and the outer bottle 48 will be pressurized before beverage transfer to several psig above beverage saturation pressure (11–13 psig, maintained by relieving regulator) to prevent foaming of the beverages due to break-out of $CO_2$. During transfer, the relieving regulator PR-3 maintains constant counter pressure (<15 psig).

The drinking containers are normally filled with 4 ounces of the selected beverage (controlled by the limited travel of the piston inside the carbonator/mixer). The maximum amount of fluid transferred is automatically controlled by the fluid management and distribution system 20. The liner is slightly larger in volume than the surrounding PET bottle to prevent any pressurization of the liner. The total volume of the liner is large enough to hold all liquid and $CO_2$ gas without getting pressurized, even if all $CO_2$ comes out of solution.

Once the beverage has been transferred, the low pressure, compressed air system will be vented to cabin atmosphere and the drinking container with the beverage will be removed for consumption. Beverage is contained inside the drinking container by surface tension. The bag cannot be pressurized since it is contained inside the rigid outer shell. A straw 53 with shut-off valve 53$a$ is inserted into the bottle cap (press-fit). Straw, bag and shut-off valve design is similar to the drinking bags currently used aboard the National Space Transportation System (NSTS) vehicles. The total volume of liquid can be consumed through the straw as the disposable liner collapses during consumption. The liner can then be removed and the reusable polyethylene bottle can be stored for future beverage consumption. The liner with the cap and the attached straw provide one level of containment. The bags can be removed from the bottle with all 4 oz. of liquid still inside the bag.

The disposable liners, if all fluid was consumed, can be treated as wet trash and can be discarded using Shuttle facilities. Bags with partial consumption should be retrieved for post-mission analysis of consumption, eg., to correlate heart rate response and taste perception to fluid volume). The bag with the attached straw and the shut-off valve are the first level of containment for any potentially left-over fluid. Used bags are stored inside plastic film bags as a second level of containment.

Figure 5:
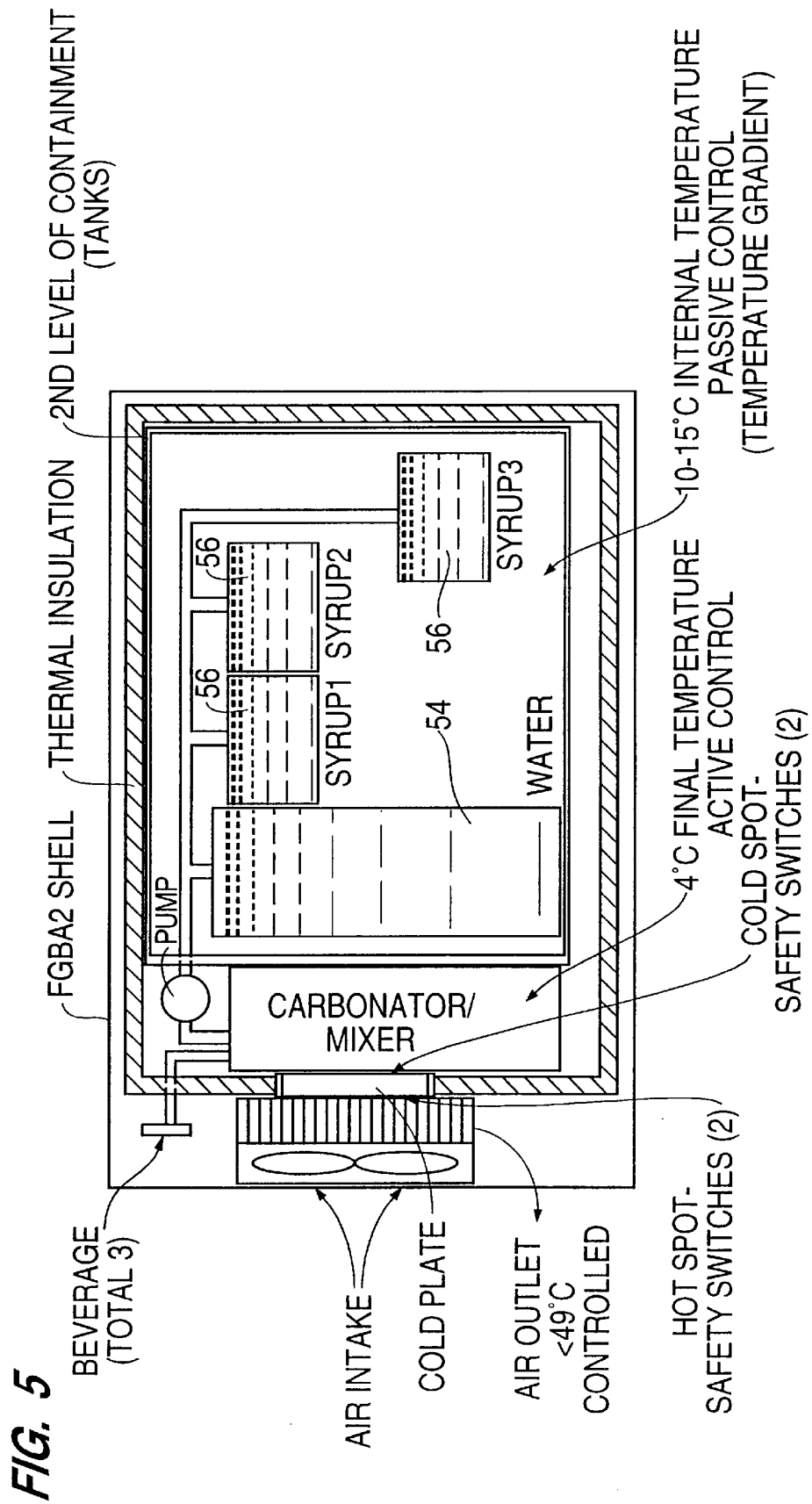
FIG. 5 is an illustration of the cooling scheme employed in the beverage system.

Referring to FIG. 5, the thermal system consists of (1) passively cooled storage tanks 54 for water and 56 for syrups (7–15° C., depending on temperature gradients), and (2) the actively cooled mixer/carbonators controlled to maintain a beverage temperature of 2.5–4° C. The inlet/outlet manifolds and the pump head are also maintained at less than ambient temperature.

The cooling system is designed to deliver beverages into the drinking container at 4° C. while minimizing power/energy consumption throughout the operation of the beverage system. The carbonator/mixer for each beverage (3 total) will be maintained at 2.5° C. (immediate availability of beverage), while the water and syrup storage tanks will be maintained at lower than ambient temperatures only (7–15° C.) through a passive system (temperature gradient inside the insulated, internal volume). The cooling system uses solid state thermo-electric devices to actively cool the carbonators only. The waste heat is removed by a forced convection system (fan, air heat exchanger) and rejected into the cabin atmosphere.

Figure 6:
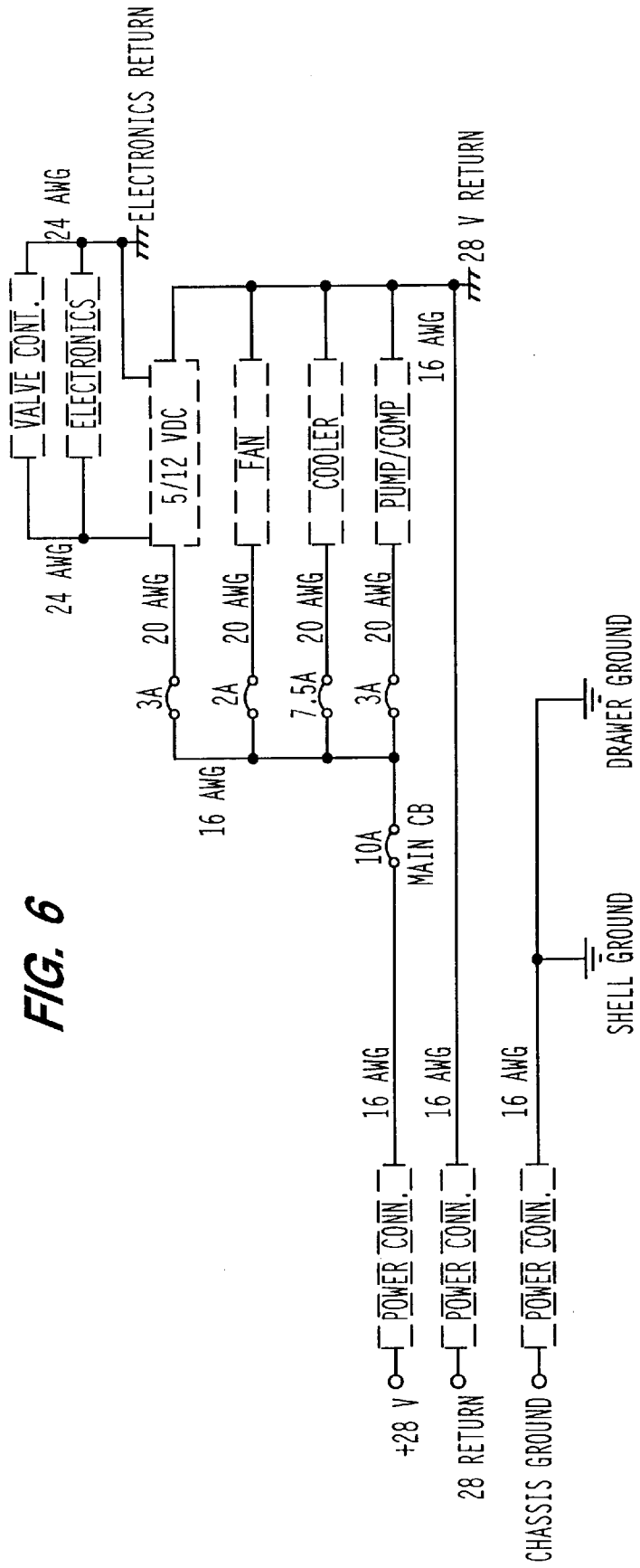
FIG. 6 is a schematic representation of the electrical power distribution system.

Referring to FIG. 6, the beverage system utilizes 28 VDC power (up to 230 Watts at full cooling capacity) as the main power input (FIG. 9). Control electronics, fans, heart rate monitoring and data acquisition operate from 5 and 12 VDC through DC—DC converters. The solid state thermoelectric coolers operate from 28 VDC (3 coolers in series). The data acquisition and control computer (DACC) utilizes a small lithium battery for real-time clock backup power.

Figure 7:
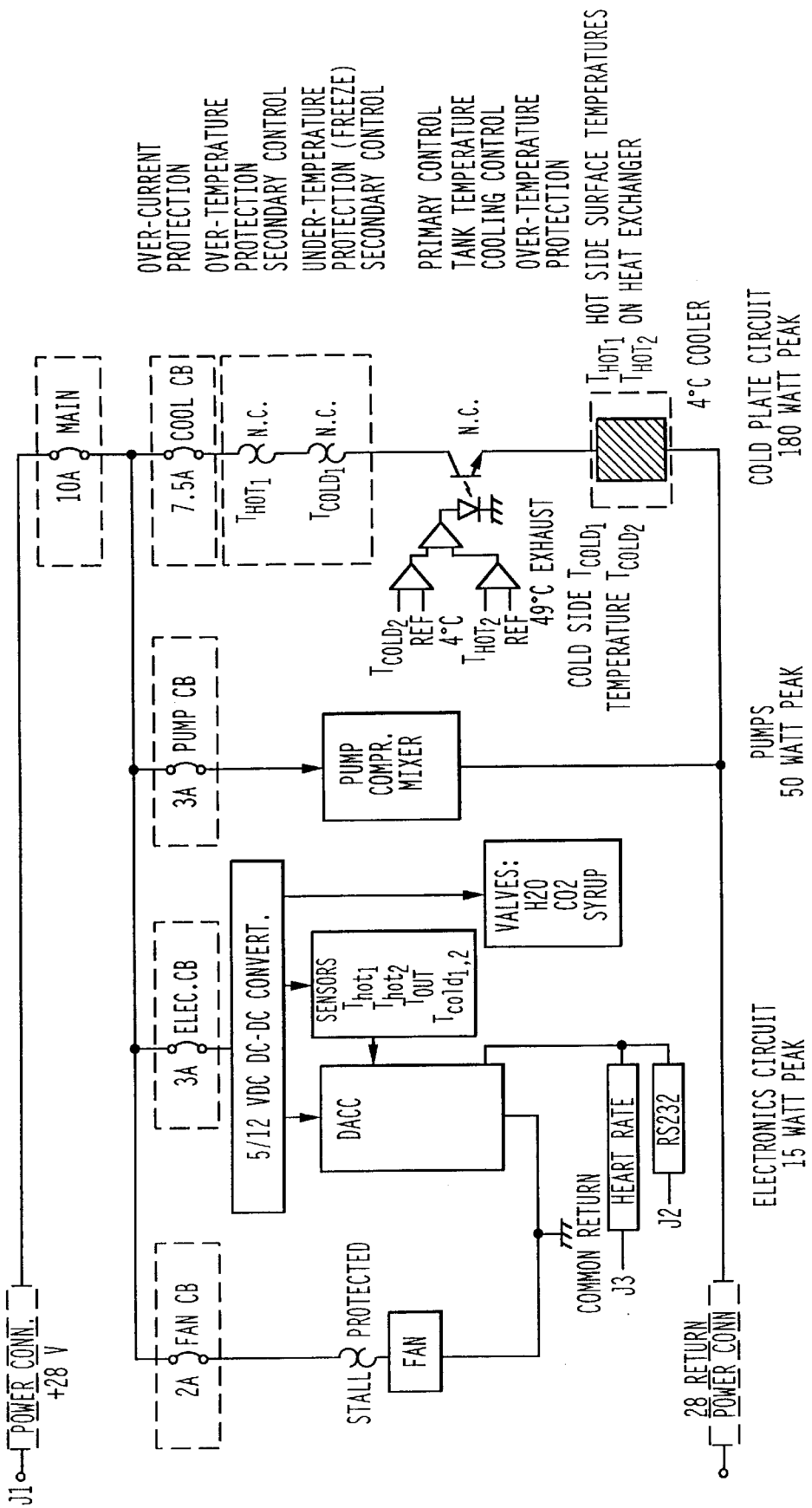
FIG. 7 is a schematic representation of the electrical and temperature control system.
Figure 8A:
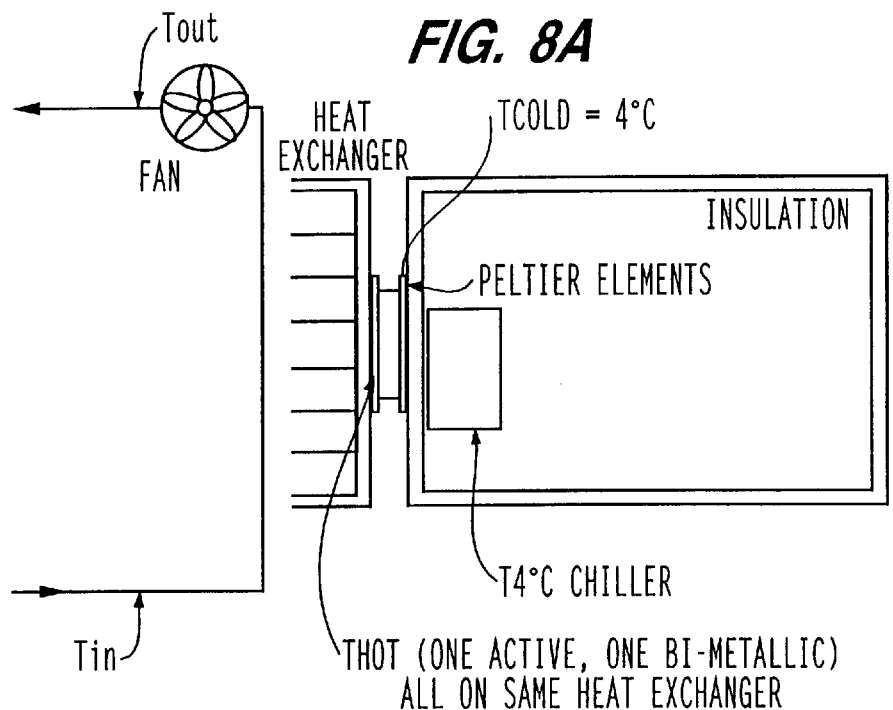
FIG. 8A is a schematic representation of the heat exchange scheme employed in the beverage system.
Figure 8B:
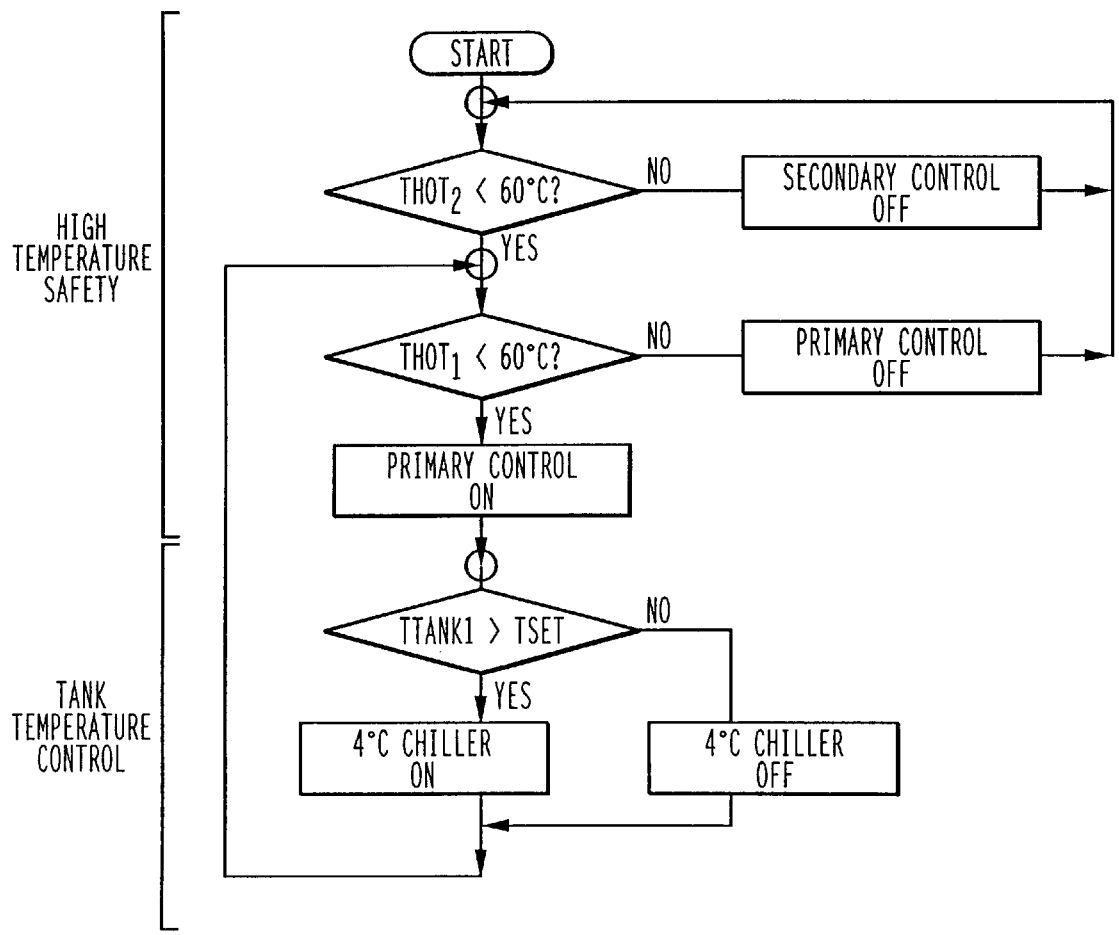
FIG. 8B is a flow chart for the temperature control system.

The battery system, illustrated in FIG. 7, has three independent controls to prevent charging of the lithium battery while external power is applied. Circuit breakers protect individual circuits (Main, Cooler, Fan, Pump, Electronics) and may be used to isolate individual circuits. The wire sizes (200° C. Teflon insulated) have been chosen according to the maximum current rating in the circuit branch, depending on circuit breaker or DC—DC converter output rating.

The beverage system data collection is achieved through a PC-104-type computer (486DX2-66 processor) with appropriate data acquisition and input/output cards. The computer uses a touch screen to display data and to receive input commands/menu selections. The computer controls the thermoelectric devices and automatically records temperature and fluid data. An RS-232 interface is provided to record data from the heart rate monitor, worn by crew members during consumption of some of the beverages. The heart rate monitor uses a light signal transmitted through the finger tip to determine heart rate and blood oxygenation levels during these tests. The RS-232 interface can also be used to download data to or from a Payload and General Support Computer (PGSC).

The computer is powered from the 28 VDC interface via a 5 VDC DC—DC converter. An internal lithium battery maintains the real-time clock of the computer. No other computer component requires battery power (battery-free RAM/EEPROM). In case of power loss, the computer will automatically resume nominal operations after power is restored. The battery design is two-fault tolerant against charging of the lithium batteries.

The heart rate monitor is a standard, commercially available unit for measuring pulse rate and blood oxygenation level non-intrusively through LED light transmission signals through the finger. The sensor probe is attached to the crew member's fingertip by an OxyTip™ self-adhesive sensor connected to the associated electronics and the computer for data storage. Pulse rates and oxygenation level are measured from a signal generated by a LED and an infrared sensor located on the fingertip assembly. There is no direct electrical contact between the sensor and the crew member.

The beverage system will be prepared and loaded onto the space vehicle with all of the necessary components ($CO_2$, water, beverage syrup) during late load operations (approximately L-72 hours). The beverage system payload will not be powered during ascent due to power limitations in the mid-deck environment. The beverage system will be powered once on orbit and will require approximately 12 hours to reach final beverage temperatures. The beverage system will remain powered until deactivation to maintain the beverages at 2.0–4.0° C.

The beverage system will be operated several times during the flight at intervals spaced from the beginning to the end of the flight (3 sessions for each astronaut, each session evaluating 3 drinks each). In this manner, a time course of taste perception change and heart rate measurements related to the duration of microgravity exposure can be established. Each operation can be done by a single crew member. For one session, one crew member, instrumented with the heart rate monitor, will operate the beverage system, while the second crew member obtains video and 35 mm photos to document fluid transfer. The scheduled sessions will consume 54 beverages. Up to 40 additional beverages will be available for unscheduled ad-lib sessions, which include taste perception only, but no heart rate monitoring.

It is also anticipated that the beverage system can be utilized by any astronaut to obtain beverages of their choice at their convenience. For that purpose, the beverage system payload is located in the mid-deck to be available during normal meal consumption. Up to 94 beverages may be available during the mission (4 oz. each). Taste perception questionnaires will be evaluated for all drinks consumed. In addition, the data acquisition and control system collects sensor data related to fluids handling, payload operation and heart rate monitoring.

Prior to dispensing a beverage, the astronaut assembles a drinking container 46 from a personalized bottle 48 (reusable) and a disposable liner 50. The liner 50 includes a screw-cap 52 that connects the bag to the bottle. The drinking container attaches to the dispensing system through a receptacle interface 54 incorporating a 45° turn design, illustrated in FIG. 14. Each receptacle interface provides three independent seals against beverage leakage (2 O-rings, one interference fit). During dispensing operations, the drinking containers will be pressurized to 11–13 psig (<15 psig). The crew member will then transfer 4 ounces of the carbonated or non-carbonated beverage into the drinking container. Fluid transfer can only occur if the drinking container is connected and sealed (leak test through back pressure decay). Heart rates will be monitored prior to, during, and after beverage consumption. Following transfer, the beverage will be consumed through a straw. A standard taste perception questionnaire will then be completed using the touch-screen monitor. Once all operations have been completed, the drinking containers will be disassembled and stowed. For "ad lib" beverage consumption, only a taste questionnaire will be filled out (integrated as part of the drinking container). A total of approximately 94 drinks are available based on the 2.0 to 2.5 gallons of water.

Following the last operation, the beverage system will be powered off and configured for reentry. After the mission is completed, taste perception questionnaires will be analyzed and compared against similar data collected on the ground. Further, the heart rate sensor data will be transferred from the data acquisition system, analyzed and compared with ground data. Finally, the camcorder data will be evaluated with regard to fluids transfer behavior (foaming, transfer, fluid positioning) and overall payload operations.

Due to resource constraints, the beverage system payload will be launched unpowered. The main $CO_2$ shut-off valve NV-1 will be closed (unpressurized system). Once on orbit, beverage system will be powered. Prior to the first beverage dispensing, the thermo-electric devices will achieve the desired fluid storage temperature (2.0–4.0° C.) and the $CO_2$ valve will be opened to enable carbonation of future drinks. One drink each will then be available (mixing/carbonation already performed on ground). Table 5 summarizes sequential events initiated by an astronaut for beverage dispensing and beverage replenishment.

The beverages are stored as concentrated syrup and water. Syrup and water are typically mixed at a ratio of 1–5.5. The water for the beverages is held in one or two tanks containing a total of up to 2.5 gallons. The water and syrup tanks are non-pressurized bladder tanks, additionally contained in a second level of containment (water-tight aluminum tank). The thermal insulation (foam) acts as a third level of containment.

Accidental beverage dispensing is avoided through redundant safety controls. Beverages can only be dispensed if a drinking container is connected and sealed (computer control). If unused, the beverage ports will be sealed with a locking cap, in addition to the closed dispensing valve. The bottle interface features three independent seals against liquid leakage during beverage transfer (2 O-rings, one interference fit).

The major heat source are the solid state thermoelectric coolers attached to the air heat exchanger. These components are inaccessible to the crew. In case of a fan failure, blocked air inlet or extreme air inlet temperatures, a redundant control circuitry will interrupt the power to the coolers (bimetallic switch and active controller). Tests will verify the interruption of power prior to reaching temperature extremes (hot, accessible surface above 45° C., hot exhaust above 49° C.).

The data acquisition and control computer contains a 3.6 VDC lithium battery to maintain the real-time clock. The lithium battery features two protection devices against charging of the lithium battery while external power is applied. In addition, the clock/motherboard design features an additional diode against charging of the battery. The computer operates from 5 VDC when connected to external power (DC—DC converter with regulator).

As shown in FIGS. 9A and 9B, the lithium battery is protected from charging by two blocking diodes or a blocking diode and a current-limiting resistor. The battery is charge tolerant to 50 mA. The motherboard features an additional blocking diode.

The cooling fans are low speed (<8000 RPM) and are contained within the air circulation system which is inaccessible to the crew. Power to the fan(s) is controlled through a circuit breaker located on the beverage system front panel. The fan is stall protected (factory). A fan inlet and outlet screen is designed to prevent crew access, contain fan parts and to keep cabin debris from coming in contact with the fan blades. The kinetic energy of the fan is conservatively calculated to 5.7 ft lbf, and the rated speed is 3,600 RPM. The fan impeller runs inside a fan housing. The air inlets and outlets are protected by stainless steel screen.

The main circuit breaker (10 amp) removes power to all beverage system circuits (fan, pumps, thermoelectric devices). All electric solenoid valves will be in safe positions if unpowered (normally closed).

The main high-pressure valve NV-I stops all $CO_2$ flow from the pressurant bottle PB-1 (90 ccm two-phase $CO_2$). Leakage of all $CO_2$ does not increase the $CO_2$ partial pressure in the cabin to critical/toxic levels.

Figure 10A:
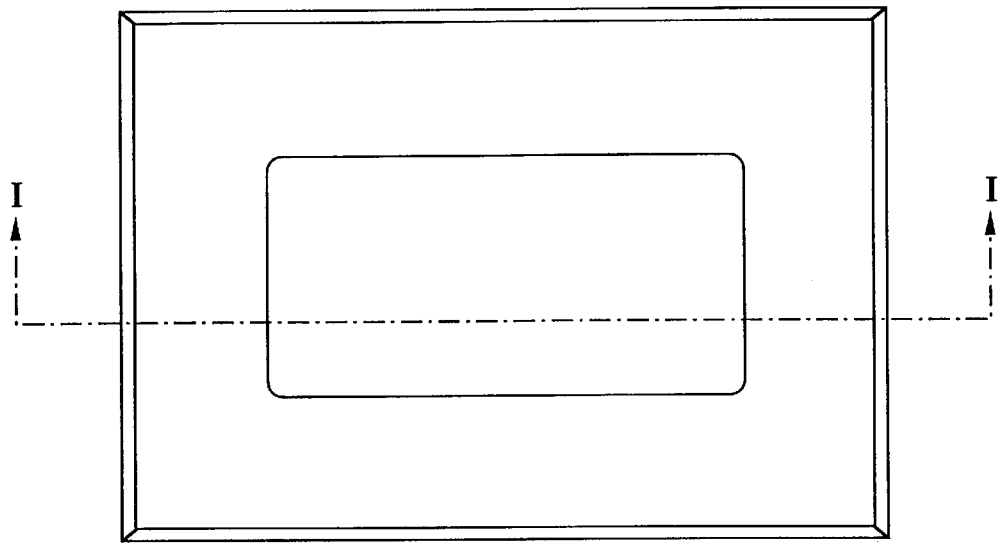
FIGS. 10A and 10B illustrate front and side views of the touch screen control/display panel employed in the beverage system.
Figure 10B:
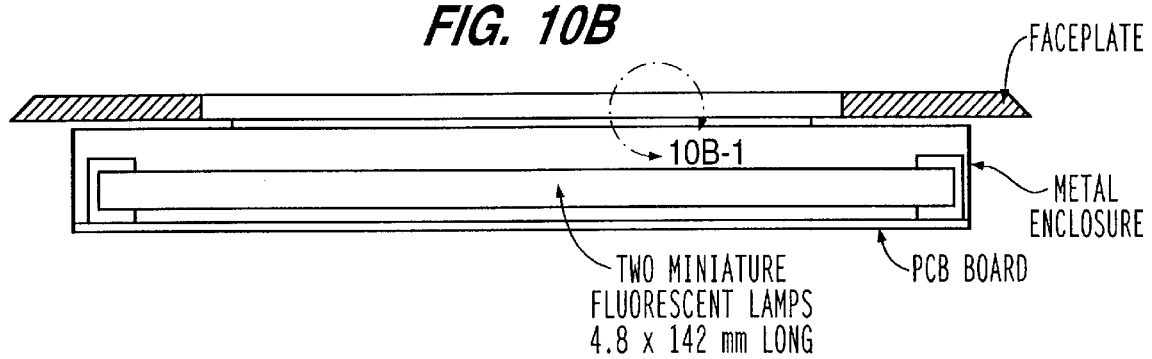
Figures 1, 10B:
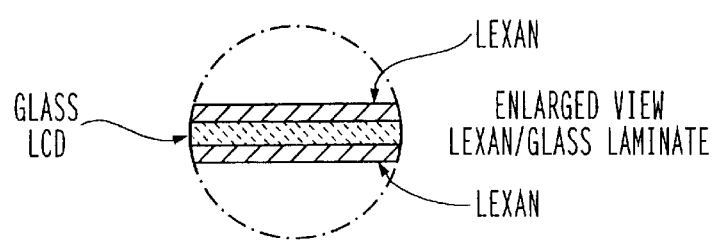
Figure 11:
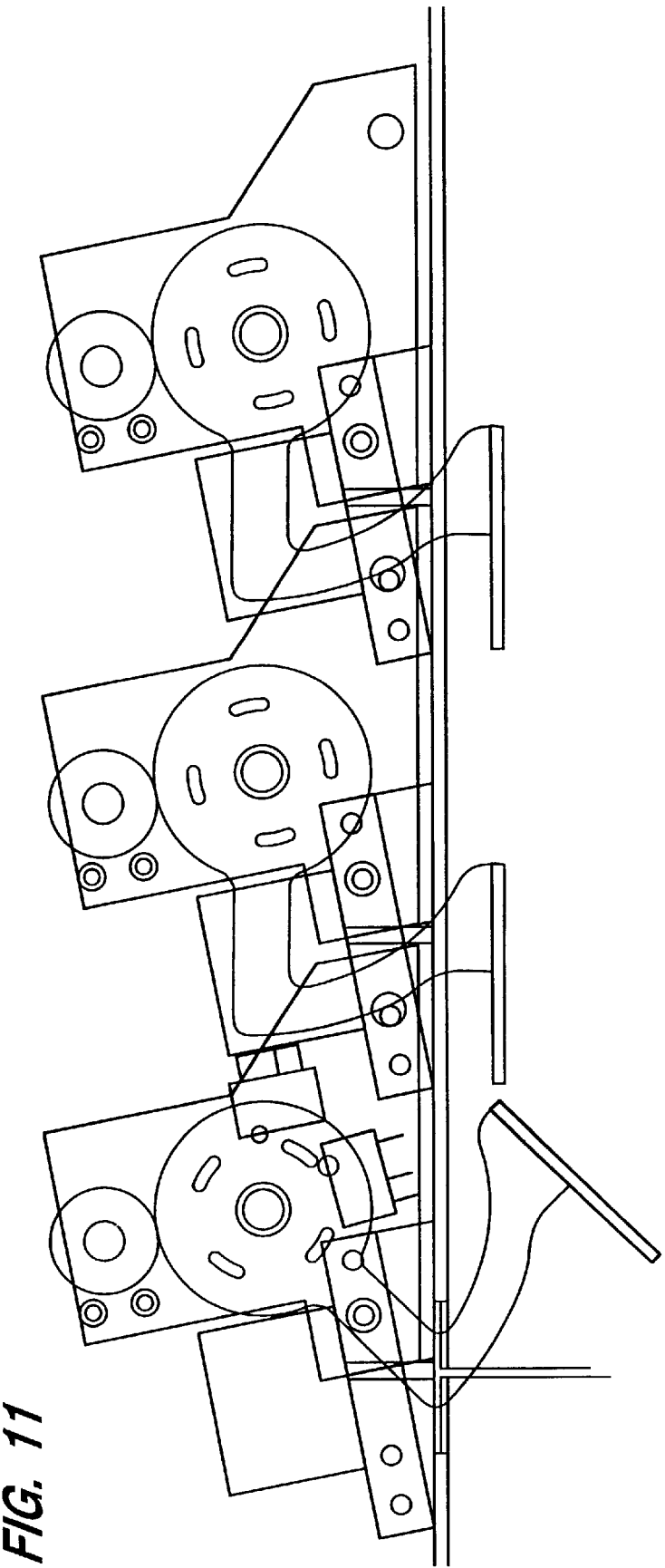
FIG. 11 illustrates the valve actuators disposed on the front panel of the enclosure module.

Referring to FIGS. 10A and 10B, the beverage system computer uses a Glass-Lexan-laminated LCD as well as two cold-cathode fluorescent lamps for LCD back lighting. The glass LCD is contained/laminated within two layers of Lexan, which would contain any glass particles should the glass break. The touch screen back light is provided by two miniature fluorescent lamps. The lamps are inaccessible even if the glass LCD would break. The lamps are rated for more than 100 g vibration loads. The potential glass fragments from a broken lamp are enclosed inside the LCD enclosure, which consists of the Lexan front, the steel enclosure on the sides and the PCB back, all contained within the touch screen enclosure. The cold cathode lamps contain small amounts of mercury (<5.3 mg).

The two back light cold cathode fluorescent lamps in the touch screen utilize a small, 600 VDC electronic ballast/inverter. The high voltage source is inaccessible to the crew (touch screen enclosure).

The heart rate sensor uses low voltages (<5 VDC) to drive LEDs in the self-adhesive, non-intrusive sensor.

Variations and modifications of the present invention as disclosed in the drawings and the foregoing description which would be obvious to persons of ordinary skill in the art are intended to be included within the scope of the claims.

TABLE 1

MDP versus Temperature for the High Pressure CO2 System. The pressure-temperature relationship shown assumes filling at 20° C. to DOT specification and constant volume (specific volume = 0.03 ft$^3$/lb.) change to the temperature/pressure shown. An MDP of 1,600 psig has been chosen based on the worst case temperature environment according to SPACELAB IDD.

| Temperature | [°C.] | 20 | 25 | 30.8 | 37.7 | 49 |
|---|---|---|---|---|---|---|
| Temperature | [°F.] | 68 | 77 | 87.8 | 100 | 120 |
| Resulting Pressure = MDP | [psia] | 816 | 910 | 1,066 | 1,250 | 1,600 |

TABLE 2

Saturation Pressure as a Function of Temperature (i.e. the pressure of beverages left in the sealed carbonator and temperature increase due to cooling system failure). It is assumed that the temperature of the beverages will not exceed 35° C. in case of power failure/unpowered FGBA. This will result in an MDP of 48.3 psig for the carbonator (loss of cooling capability with one drink in the carbonator).

| Temperature | [°C.] | 0 | 10 | 20 | 30 | 35 | 40 | 45° C. | 50° C. |
|---|---|---|---|---|---|---|---|---|---|
| Resulting Pressure | [psig] | 6.7 | 16.1 | 27.1 | 40.5 | 48.3 | 57.1 | 67.2 | 78.7 |

TABLE 3

Summary of pressurized beverage sub-systems. An MDP of 100 psig was chosen based on the dead head pressure of the pump. Pressure sensor and bleed valve actually limit the pressure to less than 80 psig (1 fault tolerant).

| System | Purpose | MOP | MDP |
|---|---|---|---|
| Metering Pump | liquid transfer from storage to carbonator | 50 psig delivery pressure) | 100 psig (dead head pressure of pump). |
| Carbonator/Mixer | mix and carbonate H2O, Syrup and CO2 | 23.5 psig | 100 psig (dead head pressure of pump, otherwise 50 psig - CO2 pressurization system) |
| Beverage after carbonation in carbonator | consumption | 9 psig @ 4° C. | 48.3 psig @ 35° C. (warming due to cooler failure) |
| Beverage after carbonation in drinking container | consumption | 0 (ventured to ambient) | 0 (vented to ambient) |

TABLE 4

Summary of pressurized sub-systems. The MDP of the high pressure CO2 system is 1600 psig, based on worst case temperature environment. The MDP of all other pressurized systems is 50 psig, based on two-fault tolerant relieving systems and/or max. delivery pressures (pumps).

| System | Purpose | MOP | MDP |
|---|---|---|---|
| High Pressure CO2 store | CO2 store | 1.066 @ 30° C. | 1,600 psig @ 49° C. |
| Low Pressure CO2 | carbonation | 23.5 psig | 50 psig (two fault tolerant relief system) |
| Low Pressure Compressed Air | beverage expulsion | 25 psig | 32 psig (compressor dead head pressure + relieving regulator) |
| Low Pressure Compressed Air | counter pressure | 15 psig | 32 psig (compressor dead head pressure + relieving regulator) |
| Beverage system | carbonation | 50 psig (pressure gauge/control) | 100 psig (bypass valve, pressure sensor, dead-head pressure, stall protection) |
| Beverage after carbonation in carbonator | consumption | 9 psig @ 4° C. | 48.3 psig @ 35° C. (break-out of CO2 during warming/cooling failure) |

TABLE 4-continued

Summary of pressurized sub-systems. The MDP of the high pressure CO2 system is 1600 psig, based on worst case temperature environment. The MDP of all other pressurized systems is 50 psig, based on two-fault tolerant relieving systems and/or max. delivery pressures (pumps).

| System | Purpose | MOP | MDP |
| --- | --- | --- | --- |
| Beverage after carbonation in drinking container | consumption | 0 (vented to ambient) | 50 psig (vent-hole plugged, beverage @ 35° C.) |

TABLE 5

Summary of control/astronaut activities during beverage dispensing and replenishment.

| Activity | Astronaut | Automated Control |
| --- | --- | --- |
| Prepare Drinking Container a or c | insert generic bottle liner into bottle connect bottle to selected beverage port a, b, or c | maintain proper beverage temperature inside carbonators/mixers. |
| Pressurize Drinking Container a, b, or c | select beverage a, b, or c | Compressor on<br>SV-3 closes snift line<br>SV-4 a, b, or c open<br>verify G-4 = 11—13 psig |
| Transfer Beverage | open SV-7 a, b or c | SV-2 a, b, or c open |
| Complete Transfer | close SV-7 a, b, or c | SV-2 a, b, or c close<br>SV-3 open snift line<br>SV-4 a, b, or c close |
| Prepare Drinking | verify G-4 = 0<br>disconnect bottle<br>insert straw | |
| Pressurize Carbonator a, or b | | open SV-1 a or b<br>close SV-1 a or b |
| Load, mix and carbonate beverages (replenish previously selected beverage a, b, or c) | | SV-5 a, b, or c open (syrup inlet)<br>SV-6 a, b, or c on (outlet)<br>pump on (20 ml)<br>pump off<br>SV-5 a, b, or c close (inlet)<br>mixer a, b, or c on<br>SV-5 w open (water inlet)<br>pump on (100 ml)<br>pump off<br>SV-5 w close (inlet)<br>SV-6 a, b, or c close (outlet)<br>mixer off |

Computer Control

I. Dispense Test Drink:

Screen enabled By Astronaut                                                                                 Dig.Inp.13 High
    → display Coke symbol
Astronaut pressed Coke Symbol
    → display crew identification screen
Astronaut selected crew ID
    → display Astronaut ID verification screen
Astronaut pressed 'CORRECT' button
    → display Status Line > "AD-LIB" "TEST DRINK"
Astronaut Selected "TEST DRINK"
        → set flag for 'TEST DRINK'
        → open data file for astronaut and retrieve assigned drinks from test matrix
            (display the two required drinks and their assigned bottles)
        → Status Line > "Drink 1 = ..., Drink 2 = ..."
        → Command Line > "Attach cable to heart rate sensor..."
Astronaut presses continue
        → switch heart rate sensor ON                             Dig.Out.20 High
           create appropriate data file for astronaut / session / beverage,
           start recording data in data file, , write 'section 1' data)
        → display Status Line > "Bev.X1"
        → display Command Line > "Remove beverage X1 port cap..."
Astronaut presses continue
        → display Status Line > "Pressurizing bottle"
        → display Command Line > "WAIT"
        → switch valve Snift Valve SV-3 to "through" position         Dig.Out.09 High
        → open backpressure valve for Bottle X (SV-4) (Bev.X))       Dig.Out.06/07/08 High
        → switch Compressor on                                    Dig.Out.02 High
Pressure P4 reaches 11 psig
        → switch Compressor off                                 Dig.Out.02 Low
        → perform pressure decay test (i.e. P4 has to remain at 11 psig)
            (whenever P4 drops below 10.5 psig, then Compressor ON     (Dig.Out.02 High)
        → display Status Line > "Bottle Pressurized"
        → display Command Line > "Pull Beverage X1 Tap"
Astronaut opens Tap X (Plug Valve PV-2(Bev.X))                Dig.Inp.10/11/12 Low
switch indicates fully open                                           Dig.Inp.07/08/09 High
        → display Status Line > "Transferring Beverage"
        → display Command Line >"WAIT"
        → open Expel X (SV-2(Bev.X))                           Dig.Out.10/11/12 High
        → switch Compressor on                                  Dig.Out.02 High
Piston sensor goes from 'full' to "empty"                       Dig.Inp.04/05/06 Low
        "empty" / all expelled                                 Dig.Inp.01/02/03 High
        → switch compressor off                                    Dig.Out.02 Low
        → display Status Line . "Transfer Complete"
        → display Command Line > "Close Beverage X1 Tap"
Astronaut closes Tap X (Valve 7(Bev.X))
The 'open' microswitch on tap (Bev.X) opens               Dig.Inp.07/08/09 Low
The valve is fully closed and microswitch 'closed'         Dig.Inp.10/11/12 High
        → switch expel valve off / Expel X (SV-2(Bev.X)) off       Dig.Out.10/11/12 Low

| | |
|---|---|
| → display Status Line > " Venting Bottle" | |
| → display Command Line > "WAIT" | |
| switch Toggle Sniff Valve SV-3 to" Sniff" position (de-energized) | Dig.Out.09 Low |
| Wait for P4 to drop to 0 psig. When pressure P4≤ 0.2 (i.e. = 0) psig: | |
| → display Status Line "Drink Ready" | |
| → display Command Line > "Remove bottle..." | |
| → switch off backpressure valve for Bottle X (SV-4x) | Dig.Out. 06/07/08 Low |
| Astronaut presses CONTINUE | |
| → display Status Line > "Collecting Baseline Data" | |
| → in data file; write 'section 2' data) | |
| → start 60 second count-down | |
| → display count-down, write heart rate data, read from serial port | |
| 60 seconds elapsed: | |
| → display 'Press Continue, Then Start Drinking' | |
| Astronaut pressed Continue: | |
| → display Status Line > "Astronaut is Drinking" | |
| → in data file; write 'section 3' data) | |
| → start second count-up (timer) to display elapsed time since start drinking | |
| → write heart rate data, read from serial port | |
| Astronaut pressed Continue: | |
| → display Status Line > "Collecting Data" | |
| → in data file; write 'section 4' data) | |
| → start 300 second count-down | |
| → display count-down, write heart rate data, read from serial port | |
| 300 seconds elapsed: | |
| → display 'Taste Questionnaire' | |
| → turn off heart rate sensor | Dig.Out.20 low |
| → close data file for this astronaut, beverage, session | |
| → read taste questionnaire answers, prev / next / complete button | |
| → make new drink (see below) | |
| → wait for complete button from taste perception | |
| 'Complete' Button was pressed in Taste Perception: | |
| → check whether first or second beverage | |
| if this is first beverage, repeat above with display of beverage | |
| if this was second beverage: | |
| → display 'TEST COMPLETE' message | |
| → after 30 seconds, display Coke symbol | |

II. Dispense Ad-Lib Drink (same as before, but ;.

| | |
|---|---|
| Screen enabled by Astronaut | Dig.Inp. 13 High |
| → display Coke symbol | |
| Astronaut pressed Coke Symbol | |
| → display crew identification screen | |
| Astronaut selected crew ID | |
| → display Astronaut ID verification screen | |
| Astronaut pressed 'CORRECT' button | |
| → display Status Line > "AD-LIB" "TEST DRINK" | |
| Astronaut Selected "AD LIB" | |
| → set flag for 'AD LIB DRINK' | |
| → verify which drinks are still available based on past and anticipated consumption display only the drinks that are actually available | |
| → Status Line > "Drink 1 = bottle X, ..." create appropriate taste perception data file for astronaut / session / beverage, write flag to remember who has to still answer taste perception questionnaires | |
| → display Command Line > "Remove beverage X1 port cap..." | |
| Astronaut presses continue | |
| → display Status Line > "Pressurizing bottle" | |
| → display Command Line > "WAIT" | |
| → switch valve Snift Valve SV-3 to "through" position | Dig.Out.09 High |
| → open backpressure valve for Bottle X (SV-4(Bev.X)) | Dig.Out.06/07/08 High |
| → switch Compressor on | Dig.Out.02 High |
| Pressure P4 reaches 11 psig | |
| → switch Compressor off | Dig.Out.02 Low |
| → perform pressure decay test (i.e. P4 has to remain at 11 psig) (whenever P4 drops below 10.5 psig, then Compressor ON | (Dig.Out.02 High) |
| → display Status Line > "Bottle Pressurized" | |
| → display Command Line > "Pull Beverage X1 Tap" | |
| Astronaut opens Tap X (Valve 7(Bev.X)) | Dig.Inp.10/11/12 Low |
| switch indicates fully open | Dig.Inp.07/08/09 High |
| → display Status Line > "Transferring Beverage" | |
| → display Command Line > "WAIT" | |
| → open Expel X (SV-2(Bev.X)) | Dig.Out.10/11/12 High |
| → switch Compressor on | Dig.Out.02 High |
| Piston sensor goes from 'full' to "empty" | Dig.Inp.04/05/06 Low |
| "empty" / all expelled | Dig.Inp.01/02/03 High |
| → switch compressor off | Dig.Out.02 Low |
| → display Status Line . "Transfer Complete" | |
| → display Command Line > "Close Beverage X1 Tap" | |
| Astronaut closes Tap X (Plug Valve PV-2(Bev.X)) | |
| The 'open' microswitch on tap (Bev.X) opens | Dig.Inp.07/08/09 Low |
| The valve is fully closed and microswitch 'closed' | Dig.Inp.10/11/12 High |
| → switch expel valve off / Expel X (SV-2(Bev.X)) off | Dig.Out.10/11/12 Low |
| → display Status Line > " Venting Bottle" | |
| → display Command Line > "WAIT" | |
| switch Toggle Snift Valve SV-3 to" Snift" position (de-energized) | Dig.Out.09 Low |
| Wait for P4 to drop to 0 psig. When pressure P4≤ 0.2 (i.e. = 0) psig: | |
| → display Status Line "Drink Ready" | |
| → display Command Line > "Remove bottle..." | |
| → switch off backpressure valve for Bottle X (SV-4x) | Dig.Out.06/07/08 Low |
| Astronaut presses CONTINUE | |

III. Re-Make Beverage:

If the beverage to be loaded is PowerAde skip to XXXX (no carbonation)
    → measure P-1 and verify that it is > 50 psig (CO2 tank pressure - still full)
If pressure P-1 is less than 50 psig, display "OUT OF CO2 - NO MORE FIZZ"
    → measure P2 and verify that it is 23.5 psig
If pressure P-2 is less than 23.0 psig, display "LOW PRESSURE"
    → display P-2 on screen and tell astronaut to adjust P-2 to 23.5 psig
If pressure P-2 is too high (>24.0 psig), display "PRESSURE TOO HIGH"
    → tell astronaut to turn PR-1 regulator 1/2 turn ccw, then wait for CONTINUE
Pressure P-2 was 23.5 psig or CONTINUE was pressed, then:
    → Open CO2 precharge valve (SV-1x)
    → measure P2 and verify that it is 23.5 psig (may take 10 seconds)     Dig.Out.04/05 High
If pressure P-2 does not reach 23.5 psig within 15 seconds and remains low,
    → display P-2 on screen and tell astronaut to adjust P-2 to 23.5 psig
    → ~~Check that Piston sensor indicates "full"~~     ~~Dig.Inp.__ High~~
    ~~Dig.Inp.__ Low~~
    → switch valve CO2(Bev.X) off if P-2=23.5psig     Dig.Out.04/05 Low
XXX: continue for non-carbonated drinks:
    → switch valve BevIn(Bev.X) on (SV-5x) (syrup)     Dig.Out.14/15/16 High
    → reset pulse counter
    → switch pump(Bev.X) on     Dig.Out.17/18/19 High
        measure P5(Bev.X) continuously at high speed (10 Hz)
        If P(Bev.X) > 50 psig, then turn off pump     (Dig.Out.17/18/19 Low)
        Once P5(Bev.X)<45, turn on pump again until pulse count reaches
            desired level for syrup     (Dig.Out.17/18/19 High)
    → count pulses on pulse counter pump (Bev.X)     PulsIn__
    → switch agitator (Bev.X) on     Dig.Out.21/22/23 High
Wait until pulse count reaches required level for syrup = f(Bev.X)
    → turn off pump (Bev.X)     Dig.Out.17/18/19 Low
    → switch valve BevIn (SV-5x) - OFF (= water)     Dig.Out.14/15/16 Low
    → Reset pulse counter
    → switch pump (Bev.X) on     Dig.Out.17/18/19 High
        measure P5(Bev.X) continuously at high speed (10 Hz)
        If P5(Bev.X)>50 psig, then turn off pump     (Dig.Out.17/18/19 Low)
        Once P5(Bev.X)<45, turn on again until
            pulse count reaches desired level     (Dig.Out.17/18/19 High)
    → count pulses on pulse counter of pump(Bev.X)     PulsIn__
Wait until pulse count reaches required level f(Bev.X)
    → turn off pump (Bev.X)     Dig.Out.17/18/19 Low
    → Continue agitator (Bev.X) for 15 more seconds
Agitator (Bev.X) was on for 15 seconds:
    → switch agitator (Bev.X) - OFF     Dig.Out.21/22/23 Low → display 'Taste Questionnaire'
→ display command line: 'ANSWER NOW OR LATER;
If LATER was pressed:
    → write flag to remember to ask next time to complete questionnaire, then
    → display 'TEST COMPLETE / ANSWER LATER'
    → display Coke symbol after 30 seconds
If NOW was pressed, wait for taste perception answers, then:
    → read taste questionnaire answers, prev / next / complete button
    → make new drink (see below)
    → wait for complete button from taste perception menu
'Complete' Button was pressed in Taste Perception:
    → display 'TEST COMPLETE' message
    → after 30 seconds, display Coke symbol

IV Temperature Control and Environmental Data Acquisition:
Measure analog sensors continuously for the following conditions:

1. → measure carbonator temperatures $T_{carb}$ (T1):
   If the temperature $T_{carb}$ (T1) is above $T_{set}$ (=4.0°C), then:
   → turn on thermoelectric coolers　　　　　　　　　　　　　　　　　　　　Dig.Out_24 High
   Once the temperature $T_{carb}$ (T1)1 drops below $T_{set}$ - $T_{hysteresis}$ (=2.5°C)
   → turn off thermoelectric coolers　　　　　　　　　　　　　　　　　　　　Dig.Out_24 Low 2. → measure fan exhaust temperature $T_{out}$ (T7):
   If the temperature $T_{out}$ (T7) is above $T_{max\,out}$ (=45°C), then:
   → turn off thermoelectric coolers　　　　　　　　　　　　　　　　　　　　Dig.Out_24 LOW 3. → measure hot side heat exchanger temperature $T_{hot}$ (T3):
   If the temperature $T_{hot}$ (T3) is above $T_{max\,hot}$ (=60°C), then:
   → turn off thermoelectric coolers　　　　　　　　　　　　　　　　　　　　Dig.Out_24 LOW For test purposes, create a LOG file that writes the time tag, the condition (i.e. temperature), and the digital output command for each switching activity (time, temperature, and decimal equivalent sent to DIO).

DATA ACQUISITION:
Anticipated Data Files:
1. Engineering Data at TBD intervals:
   record all analog sensors with time tag:
   date/time, sens1, sens2, sens3, sens4, ......sens 16 (32)
2. 'Log file' to record / track each switch activity:
   record any switching function with corresponding condition and decimal equivalent of DIO:
   date/time, condition (temperature or pressure), DIO address / decimal value
3. Taste Perception answers:
   record for each drink the entered responses:
   date/time, crew id, ad lib / test drink, kind of drink, answers 1-6,
4. Heart Rate Data 1:
   file header: session#, crew ID, beverage, time/date of start
   each line: section identifier (1-4), delta time (unless constant), delta T between pulses, serial ASCII characters from heart rate monitor
5. Heart Rate Data 2:
   file header: session#, crew ID, beverage, time/date of start
   each line: analog signal from heart rate sensor (TBD, 100-200 Hz sampling rate).

Taste perception and heart rate data files are created based on astronaut entry. Astronauts may confuse their crew id / session number. Either warn astronaut about already existing file name or append to already existing file (astronaut may resume after an aborted, earlier attempt to run session).

CONTROL VARIABLES:

a) Independent Variables:
1. Beverage X (crew entered for Ad-Lib; from experimental matrix file for Test Drink).
2. Astronaut ID (crew entered).
3. Session# b) Indexed (Dependent) Variable Names:

dependent of Beverage X
- $CO_2$ valve (Bev.X)      x = 1, 2
- BevIn valve (Bev.X)      x = 1, 2, 3 (syrups)
- required pump pulse count syrup (Bev.X)      x = 1, 2, 3
- required pump pulse count water (Bev.X)      x = 1, 2, 3
- pump switch (Bev.X)      x = 1, 2, 3
- agitator switch (Bev.X)      x = 1, 2, 3
- Bev. Tap position closed switch (Bev.X)      x = 1, 2, 3
- Bev. Tap position open switch (Bev.X)      x = 1, 2, 3
- ~~Piston Position switch closed (Bev.X)~~      ~~x = 1, 2, 3~~
- ~~Piston Position switch open (Bev.X)~~      ~~x = 1, 2, 3~~ dependent of astronaut ID
- assigned beverage Bev.X for TEST DRINK      x = 1, 2, 3 (from data file)
- file name for taste perception / heart rate data dependent of session #
- astronaut may have interrupted earlier test; entering session number allows to append data to previously recorded data.

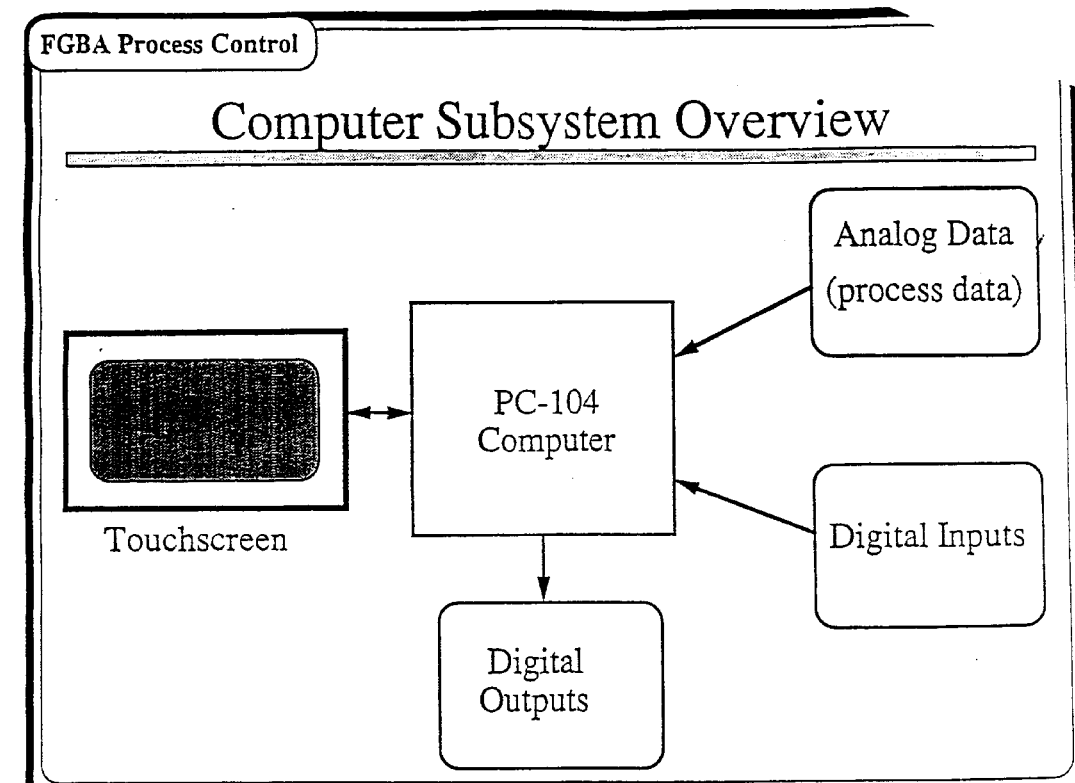

FGBA Sensor Suite

FGBA Process Control

| Ch. | Function |
|---|---|
| 1 | CO2 Bottle Pressure |
| 2 | CO2 Carbonation Pressure |
| 3 | Compressor Pressure |
| 4 | Bottle / Backpressure |
| 5 | Pump outlet pressure |
| 6 | Carbonator temp. 1 |
| 7 | Carbonator temp. 2 |
| 8 | Carbonator temp. 3 |
| 9 | Tank temp 1 |
| 10 | Tank temp 2 |
| 11 | Tank temp 3 |
| 12 | T air in |
| 13 | T air out |
| 14 | T hot (heat exchanger) |
| 15 | |
| 16 | |

| Ch. | Function |
|---|---|
| 1 | Piston 1 in (expelled) |
| 2 | Piston 2 in (expelled) |
| 3 | Piston 3 in (expelled) |
| 4 | Piston 1 out (full) |
| 5 | Piston 2 out (full) |
| 6 | Piston 3 out (full) |
| 7 | Valve 1 open |
| 8 | Valve 2 open |
| 9 | Valve 3 open |
| 10 | Valve 1 close |
| 11 | Valve 2 close |
| 12 | Valve 3 close |
| 13 | LCD enable |

| Ch. | Function | |
|---|---|---|
| 1 | computer on | |
| 2 | compressor on | |
| 3 | pump on | |
| 4 | carbonation chamber 1 | SV1a |
| 5 | carbonation chamber 2 | SV1b |
| 6 | backpressure bottle 1 | SV4a |
| 7 | backpressure bottle 2 | SV4b |
| 8 | backpressure bottle 3 | SV4c |
| 9 | backpressure / snift toggle | SV3 |
| 10 | expel chamber 1 | SV2a |
| 11 | expel chamber 2 | SV2b |
| 12 | expel chamber 3 | SV2c |
| 13 | Water in | SV5w |
| 14 | Syrup 1 in | SV5a |
| 15 | Syrup 2 in | SV5b |
| 16 | Syrup 3 in | SV5c |
| 17 | to Mixer 1 | SV6a |
| 18 | to Mixer 2 | SV6b |
| 19 | to Mixer 3 | SV6c |
| 20 | heart rate sensor on | |
| 21 | mixer 1 | H/Ca |
| 22 | " 2 | H/Cb |
| 23 | " 3 | H/Cc |
| 24 | | |

| Ch. | Function |
|---|---|
| 1 | pump strokes |
| 2 | heart rate sensor |

FGBA Process Control

General Process Control Philosophy/Methodology

- Provide redundant means of determining if process inputs meet decision criteria

- Assume that every hardware sensor input can FAIL and design, in software, methods to circumvent complete system failure

- Assume that the operator can and will make mistakes

- Enable the operator to ABORT (and return to Main Menu) at any point in the test sequence

- Implement Auto-Reset which will reset the system to nominal status if the payload receives no input for an extended time

- Provide hidden diagnostic screens with the ability to manually diagnose sensor hardware failures

FGBA Process Control

Making a New Drink

1. $CO_2$ pressure check is performed to insure in proper range for the mixing chamber pre-charge; $CO_2$ bottle pressure is checked to insure carbonation for required drinks.

2. $CO_2$ pre-charge of mixing chamber is performed for the carbonated drinks

3. Appropriate syrup outlet valve to mixing chamber is opened

4. Pump is turned ON

5. Syrup is pumped into the proper mixing chamber

FGBA Process Control

Making a New Drink

6. Mixer is turned ON

7. Mixing chamber pressure is monitored to stay below 50 psig

8. Once syrup is dispensed pump is turned OFF

9. The chamber inlet valve is switch to water

10. The pump is turned back ON

11. Water is pumped into the proper mixing chamber

12. Mixing chamber is monitored to stay below 50 psig

What is claimed is:

1. Apparatus for preparing and dispensing a beverage comprising:

sources of fluid beverage components, including syrup and water;

a mixing chamber provided with inlet and discharge ports;

a piston disposed within the mixing chamber for reciprocal movement between extended and retracted positions;

first means for (1) introducing the beverage components under pressure into the mixing chamber and (2) shifting the piston from the extended position to the retracted position in response to the introduction into the mixing chamber of at least one of the beverage components; and second means for urging the piston to the extended position to thereby dispense a mixture of the beverage components through the discharge port.

2. The apparatus as recited in claim 1, wherein the beverage components also include carbon dioxide.

3. The apparatus as recited in claim 1, and further comprising an agitator disposed within the mixing chamber for rotation about an axis which is aligned with the direction of movement of the piston.

4. The apparatus as recited in claim 3, and further comprising:

an annular formation on the piston which extends toward the agitator; and reaction surfaces on the annular formation which cooperate with the agitator to inhibit plug-like rotation of the beverage components and promote agitation thereof.

5. The apparatus as recited in claim 4, wherein the agitator is cup-shaped and the annular formation nests within the agitator when the piston is in the extended position.

6. The apparatus as recited in claim 4, wherein the reaction surfaces are provided on the inner surface of the annular formation.

7. The apparatus as recited in claim 2, and further comprising:

a cooling device for directly cooling the mixing chamber; and means for conducting heat from the syrup and water sources to the mixing chamber to thereby effect indirect cooling of the syrup and water by the cooling device.

8. The apparatus as recited in claim 1, and further comtprising:

a receptacle interface for coupling with a beverage receptacle;

a conduit providing a flow path between the mixing chamber discharge port and the receptacle interface;

means for pressurizing a beverage receptacle coupled to the receptacle interface;

means for sensing the pressurization of a beverage receptacle coupled to the receptacle interface; and means responsive to a sensed pressurization of a beverage receptacle coupled to the receptacle interface for enabling and disabling flow of beverage from the mixing chamber to the receptacle interface through the conduit.

9. The apparatus as recited in claim 1, wherein the first means introduces the beverage components into the mixing chamber in a predetermined sequence, and effects shifting of the piston from the extended position to the retracted position in response to the introduction into the mixing chamber of a first one of the beverage components.

10. The apparatus as recited in claim 9, wherein the beverage components also include carbon dioxide.

11. The apparatus as recited in claim 10, wherein the first one of the beverage components is carbon dioxide.

12. The apparatus as recited in claim 9, wherein the first one of the beverage components is water.

* * * * *

UNITED STATES PATENT AND TRADEMARK OFFICE
CERTIFICATE OF CORRECTION

PATENT NO.: 5,947,334

DATED: September 7, 1999

INVENTOR(S): Arthur G. RUDICK et al.

It is certified that an error appears in the above-identified patent and that said Letters Patent is hereby corrected as shown below:

Title Page, item [75], in the Inventors, line 2, please change "Marietta" to --Duluth--.

Signed and Sealed this

Ninth Day of May, 2000

*Attest:*

Q. TODD DICKINSON

*Attesting Officer*  Director of Patents and Trademarks